United States Patent
Nakazato et al.

(10) Patent No.: US 12,382,315 B2
(45) Date of Patent: Aug. 5, 2025

(54) DEPLOYMENT CONTROL SYSTEM, DEPLOYMENT CONTROL METHOD, AND DEPLOYMENT CONTROL PROGRAM

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/779,317

(22) PCT Filed: Dec. 9, 2021

(86) PCT No.: PCT/JP2021/045317
§ 371 (c)(1),
(2) Date: May 24, 2022

(87) PCT Pub. No.: WO2023/105708
PCT Pub. Date: Jun. 15, 2023

(65) Prior Publication Data
US 2024/0172003 A1    May 23, 2024

(51) Int. Cl.
*H04W 24/04* (2009.01)
*H04W 28/02* (2009.01)
*H04W 28/16* (2009.01)

(52) U.S. Cl.
CPC ....... *H04W 24/04* (2013.01); *H04W 28/0247* (2013.01); *H04W 28/16* (2013.01)

(58) Field of Classification Search
CPC . H04W 24/04; H04W 28/0247; H04W 28/16; H04W 24/02; H04W 28/08
See application file for complete search history.

(56) References Cited

U.S. PATENT DOCUMENTS

2019/0007992 A1* 1/2019 Kim ................... H04W 76/27
2019/0372929 A1* 12/2019 Yang .................. H04L 69/326
(Continued)

FOREIGN PATENT DOCUMENTS

JP    2017220840 A  * 12/2017
JP    2020-136787 A    8/2020
(Continued)

OTHER PUBLICATIONS

International Search Report of PCT/JP2021/045317 dated Mar. 1, 2022.

*Primary Examiner* — Joseph E Avellino
*Assistant Examiner* — Anindita Sen
(74) *Attorney, Agent, or Firm* — Sughrue Mion, PLLC

(57) ABSTRACT

An objective is to suppress degradation of the usability of radio terminals even in cases in which the modes of use of the radio terminals fluctuate.

A placement change determiner (510) determines, based on information associated with conditions or future conditions estimated from the conditions in a service area to which one or more RUs (Radio Units) in a mobile communication system belong, a placement change regarding at least one NF (Network Function) among NFs in the mobile communication system. A placement destination determiner (520) determines, based on the information, an NF to be changed and a placement destination of the NF to be changed. A deployer (530) executes the placement change by instantiating the NF to be changed at the placement destination.

15 Claims, 20 Drawing Sheets

(56) References Cited

U.S. PATENT DOCUMENTS

| | | | |
|---|---|---|---|
| 2020/0388084 A1* | 12/2020 | Bhushan | G06F 3/04845 |
| 2021/0144061 A1* | 5/2021 | Agarwal | H04L 41/0896 |
| 2021/0274406 A1 | 9/2021 | Ode et al. | |
| 2021/0352564 A1* | 11/2021 | Han | H04W 40/248 |
| 2021/0367721 A1 | 11/2021 | Tsukamoto et al. | |
| 2023/0062253 A1* | 3/2023 | Ganguli | H04L 67/10 |
| 2024/0031917 A1* | 1/2024 | Ryu | H04W 48/08 |

FOREIGN PATENT DOCUMENTS

| | | | |
|---|---|---|---|
| JP | 2021-086597 A | | 6/2021 |
| TW | 201926955 A | * | 7/2019 |
| WO | 2020/115885 A1 | | 6/2020 |

* cited by examiner

Fig. 6A

| Movement Conditions | Number of People | Attribute Information | Radio Terminal Usage | Placement Configuration |
|---|---|---|---|---|
| stationary | many people, dense | young demographic | used | Placement 11 |
| | | | not used | Placement 12 |
| | | middle-aged demographic | used | Placement 11 |
| | | | not used | Placement 12 |
| | | elder demographic | used | Placement 12 |
| | | | not used | Placement 13 |

Fig. 6B

| Movement Conditions | Number of People | Attribute Information | Radio Terminal Usage | Placement Configuration |
|---|---|---|---|---|
| stationary | few people, sparse | young demographic | used | Placement 13 |
| | | | not used | Placement 14 |
| | | middle-aged demographic | used | Placement 13 |
| | | | not used | Placement 14 |
| | | elder demographic | used | Placement 13 |
| | | | not used | Placement 14 |

Fig. 6C

| Movement Conditions | Number of People | Attribute Information | Radio Terminal Usage | Placement Configuration |
|---|---|---|---|---|
| moving | many people, dense | young demographic | used | Placement 21 |
| | | | not used | Placement 22 |
| | | middle-aged demographic | used | Placement 21 |
| | | | not used | Placement 22 |
| | | elder demographic | used | Placement 22 |
| | | | not used | Placement 23 |

Fig. 6D

| Movement Conditions | Number of People | Attribute Information | Radio Terminal Usage | Placement Configuration |
|---|---|---|---|---|
| moving | few people, sparse | young demographic | used | Placement 23 |
| | | | not used | Placement 24 |
| | | middle-aged demographic | used | Placement 23 |
| | | | not used | Placement 24 |
| | | elder demographic | used | Placement 23 |
| | | | not used | Placement 24 |

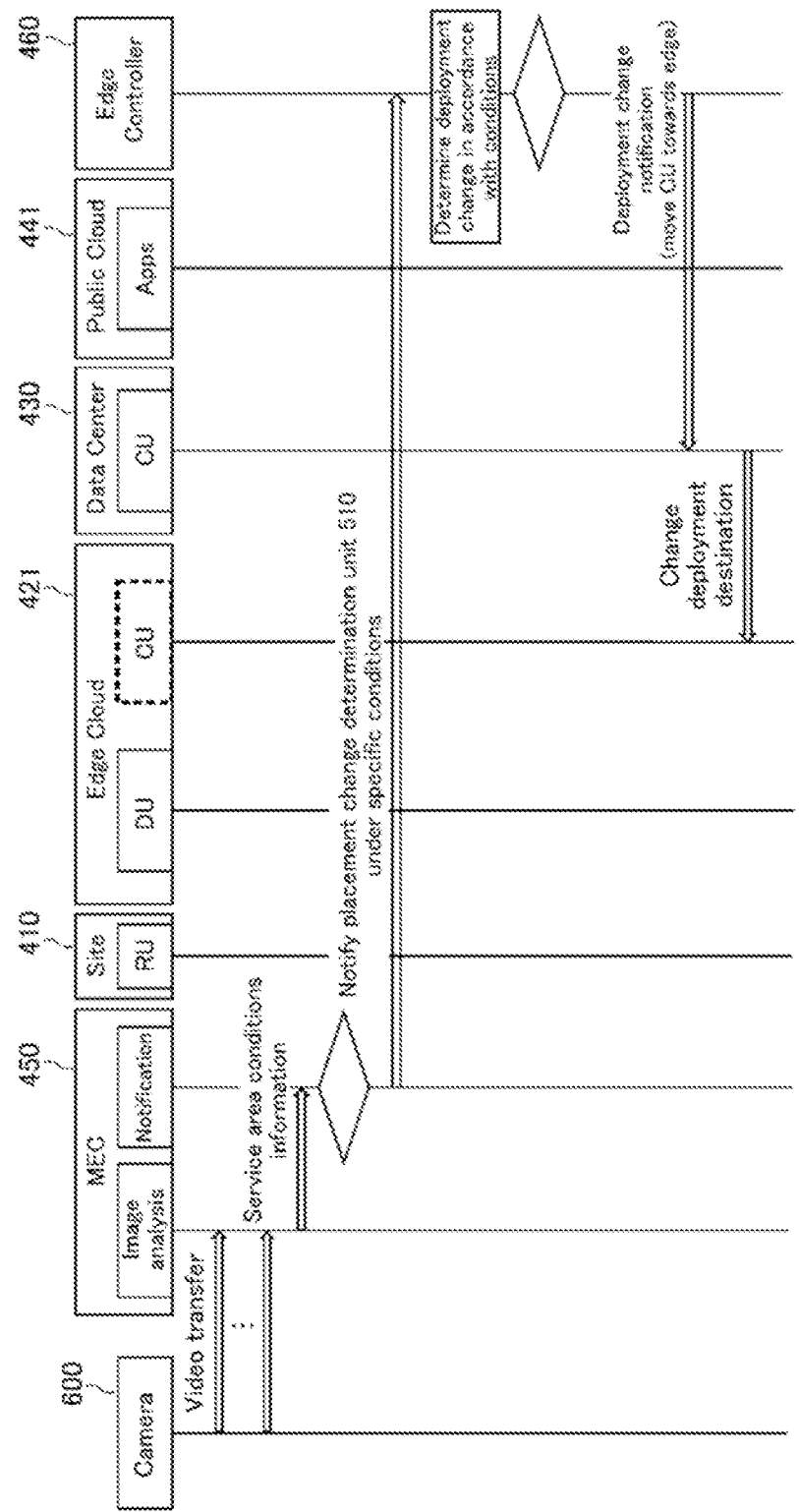

DEPLOYMENT CONTROL SYSTEM, DEPLOYMENT CONTROL METHOD, AND DEPLOYMENT CONTROL PROGRAM

CROSS REFERENCE TO RELATED APPLICATIONS

This application is a National Stage of Application No. PCT/JP2021/045317 filed Dec. 9, 2021.

TECHNICAL FIELD

The present invention relates to a deployment control system, a deployment control method, and a deployment control program.

BACKGROUND

In 5th-generation mobile communication systems (5G: 5th-Generation mobile communication systems) and Beyond 5G/6G systems that are being considered as next-generation communication schemes, higher speed/higher capacity, low latency, and multiple-access communications are possible in comparison with LTE (long term evolution)/LTE-Advanced systems.

Patent Document 1 describes that application services can be largely categorized as those of the high-capacity (eMBB: enhanced Mobile BroadBand), the ultra-low latency (URLLC: Ultra-Reliable and Low Latency Communications), and the multi-access (mMTC: massive Machine Type Communications) types, and discloses a mobile communication system architecture for each of these three types of services.

CITATION LIST

Patent Literature

Patent Document 1: JP 2020-136787 A

SUMMARY OF INVENTION

Technical Problem

However, the traffic volumes in cells covered by radio base stations differ in accordance with the modes of use of the radio terminals present in the cells, and modes of use of radio terminals are constantly fluctuating. In cases in which the modes of use of radio terminals constantly fluctuate in this way, there is room for improvement regarding how the architectures of the mobile communication systems are set.

An objective of the present invention is to provide a deployment control system, a deployment control method, and a deployment control program that suppress degradation of the usability of radio terminals even in cases in which the modes of use of the radio terminals fluctuate.

Solution to Problem

A deployment control system according to one embodiment of the present invention comprises: a placement change determiner that determines, based on information associated with conditions or future conditions estimated from the conditions in a service area to which one or more RUs (Radio Units) in a mobile communication system belong, a placement change regarding at least one NF (Network Function) among NFs in the mobile communication system; a placement destination determiner that determines, based on the information, an NF to be changed and a placement destination of the NF to be changed; and a deployer that executes the placement change by instantiating the NF to be changed at the placement destination.

In a deployment control system according to one embodiment of the present invention, the NFs (Network Functions) in the mobile communication system include an SNF (Service Network Function), a CU (Central Unit), and a DU (Distributed Unit).

In a deployment control system according to one embodiment of the present invention, the placement change determiner estimates, based on the information, an NF placement appropriate for a mode of use of a radio terminal present in the service area, and determines that the placement change is to be executed if the estimated NF placement is different from the current NF placement in the mobile communication system.

In a deployment control system according to one embodiment of the present invention, the placement change determiner uses a correspondence table, in which the information has been grouped in advance with NF placements appropriate for modes of use of the radio terminal, to estimate, from the information, the NF placement appropriate for the mode of use of the radio terminal present in the service area.

In a deployment control system according to one embodiment of the present invention, the placement destination determiner determines the NF to be changed and the placement destination in accordance with a comparison result between the NF placement appropriate for the mode of use of the radio terminal present in the service area estimated from the information and the current NF placement in the mobile communication system.

In a deployment control system according to one embodiment of the present invention, the placement destination determiner determines the NF to be changed and the placement destination by selecting, from among a plurality of prescribed placement candidates, a placement predicted to make a communication latency of the radio terminal present in the service area lower than a current communication latency.

In a deployment control system according to one embodiment of the present invention, the placement destination determiner determines the NF to be changed and the placement destination by selecting the candidate to be used from among the plurality of prescribed placement candidates based on the information.

In a deployment control system according to one embodiment of the present invention, the placement destination determiner selects the candidate such that, as a traffic volume in the service area becomes lower, fewer of the NFs are placed towards an edge of the mobile communication system with respect the radio terminal.

In a deployment control system according to one embodiment of the present invention, the placement destination determiner selects the candidate such that, as a traffic volume in the service area becomes higher, more of the NFs are placed towards an edge of the mobile communication system with respect the radio terminal.

In a deployment control system according to one embodiment of the present invention, the information includes at least one of a number of people in the service area, attribute information of people in the service area, movement conditions of people in the service area, a number of radio terminals present in the service area, and types of radio terminals present in the service area.

In a deployment control system according to one embodiment of the present invention, the information is acquired from a captured image of the service area.

In a deployment control system according to one embodiment of the present invention, the information includes information associated with RAN (Radio Access Network) communication conditions in the mobile communication system.

In a deployment control system according to one embodiment of the present invention, the service area includes a cell formed by a single DU (Distributed Unit).

In a deployment control system according to one embodiment of the present invention, the service area includes a plurality of cells formed by a plurality of DUs, and the plurality of DUs are connected to the same CU (Central Unit).

In a deployment control system according to one embodiment of the present invention, if the plurality of cells are grouped in a plurality of cell groups, then the placement change determiner determines that a UPF (User Plane Function) is the NF to be changed.

In a deployment control system according to one embodiment of the present invention, the SNF is associated with session management in a core network in the mobile communication system.

A deployment control method according to one embodiment of the present invention comprises determining, based on information associated with conditions or future conditions estimated from the conditions in a service area to which one or more RUs (Radio Units) in a mobile communication system belong, a placement change regarding at least one NF (Network Function) among NFs in the mobile communication system; determining, based on the information, an NF to be changed and a placement destination of the NF to be changed; and executing the placement change by instantiating the NF to be changed at the placement destination.

A deployment control program according to one embodiment of the present invention makes one or more processors execute the respective constituent elements in the above-mentioned deployment control system.

Effects of Invention

According to the present invention, degradation of the usability of radio terminals can be suppressed even in cases in which the modes of use of the radio terminals fluctuate.

BRIEF DESCRIPTION OF DRAWINGS

FIG. 6A is a diagram for explaining the relationship between service area status information and NF placements appropriate for the modes of use of radio terminals present in the service area.

FIG. 6B is a diagram for explaining the relationship between service area status information and NF placements appropriate for the modes of use of radio terminals present in the service area.

FIG. 6C is a diagram for explaining the relationship between service area status information and NF placements appropriate for the modes of use of radio terminals present in the service area.

FIG. 6D is a diagram for explaining the relationship between service area status information and NF placements appropriate for the modes of use of radio terminals present in the service area.

FIG. 7 is a diagram illustrating one example of the processing sequence implemented in the deployment control system according to an embodiment.

DESCRIPTION OF EMBODIMENTS

Hereinafter, one embodiment of the present invention will be explained in detail with reference to the drawings.

Embodiment

Figure 1:
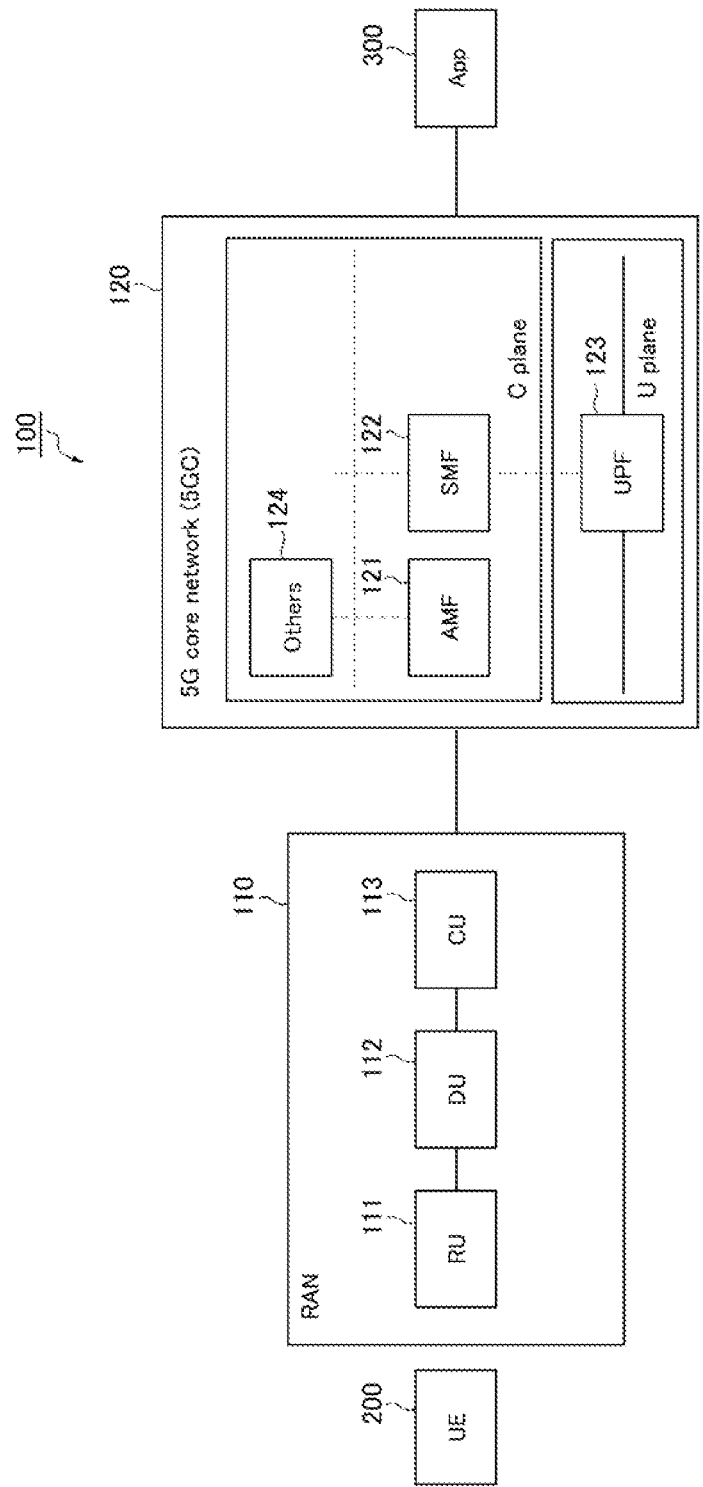
FIG. 1 is a schematic diagram illustrating one example of a mobile communication system to which the control system according to one embodiment of the present invention is applied.

FIG. 1 is a diagram illustrating one example of the functional blocks in a mobile communication system 100 utilizing the deployment control system according to one embodiment of the present invention. The mobile communication system 100 comprises a radio access network (RAN: Radio Access Network) 110 and a core network (CN: Core Network) 120.

The RAN 110 comprises an RU (Radio Unit) 111. Additionally, the RAN 110 comprises, as network functions (NFs: Network Functions), a DU (Distributed Unit) 112 and a CU (Central Unit) 113. The numbers of the RU 111 and the DU 112 are not limited to one, and there may be a plurality thereof. One or more RUs 111 are connected to one DU 112, and one or more DUs 112 are connected to one CU 113. Additionally, the CU 113 is connected to the CN 120.

The CN 120 is, for example, a 5GC network (5th-Generation Core network) including service network functions (SNFs: Service Network Functions). FIG. 1 illustrates, among the SNFs in the C plane and the U plane included in the 5GC network, only an AMF (Access and Mobility Management Function) 121, an SMF (Session Management Function) 122, and a UPF (User Plane Function) 123. The other SNFs are represented by Others 124. The AMF 121 is an NF associated with mobility management. The SMF 122 and the UPF 123 are NFs associated with session management.

Thus, the mobile communication system 100 includes a plurality of network functions (NFs). In the example in FIG. 1, the AMF 121, the SMF 122, the UPF 123, the DU 112, and the CU 113 are NFs, and the AMF 121, the SMF 122, and the UPF 123 are SNFs, which are a type of NF.

A radio terminal (hereinafter also referred to as a "UE: User Equipment") 200 connects to desired applications (hereinafter also referred to as an "App" or "Apps") 300 via the RAN 110 and the CN 120.

Figure 2:
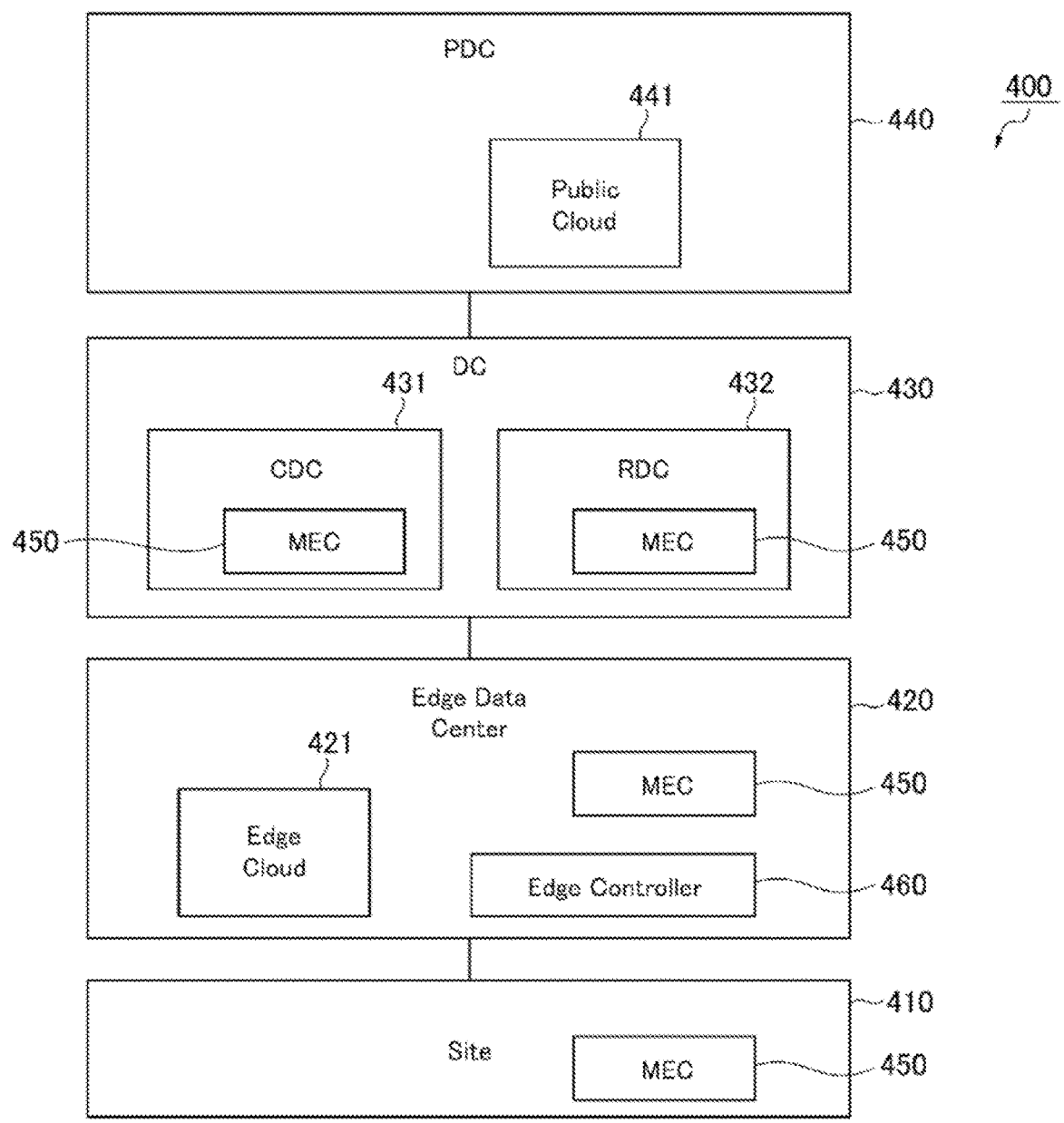
FIG. 2 is a diagram illustrating a data center group in which NFs in the mobile communication system can be placed.

FIG. 2 is a diagram illustrating a data center group 400 in which the NFs in the mobile communication system 100 can be placed. As illustrated in FIG. 2, in the data center group 400 in which the NFs of the mobile communication system 100 are placed, the data centers are classified as a site (Site) 410, an edge data center (Edge Data Center) 420, a data center (DC: Data Center) 430, and a public data center (PDC: Public Data Center) 440.

The site 410 is located near an antenna of an RU 111.

Several thousand edge data centers 420 are distributively located in the area covered by the mobile communication system 100. An edge cloud (Edge Cloud) 421 may be located in the edge data center (Edge Data Center) 420.

The data center 430 includes a central data center (CDC: Central Data Center) 431 and a regional data center (RDC: Regional Data Center) 432.

Several CDCs 431 are distributively located in the area (for example, Japan) covered by the mobile communication system 100.

Several tens of RDCs 432 are distributively located, for example, in the area covered by the mobile communication system 100. If the area covered by the mobile communication system 100 is the entire country of Japan, then one or two of the RDCs 432 may be located in each prefecture.

The public data center 440 is located on the internet. The public data center 440 may have a public cloud (Public Cloud) 441 located therein.

By being arranged as indicated above, the site 410, the edge data center 420, the data center 430, and the public data center 440 have communication distances, to the radio terminals with which they communicate, that are shorter in the indicated order. In other words, the site 410, the edge data center 420, the data center 430, and the public data center 440 are located in this order in terms of proximity to the edges with respect to the radio terminals communicating therewith.

Additionally, MEC (Multi-access Edge Computing) 450 may be located in the site 410, the edge data center 420, the DC 431, and the RDC 432.

Additionally, an edge controller (Edge Controller) 460 may be located in the edge data center 420.

The specific placement of the NFs in the mobile communication system 100 will be described below.

The respective constituent elements constituting the deployment control system 500 according to the present embodiment to be described below can be flexibly located at the site 410, the edge cloud 421, and the data center 430 in accordance with the placement locations of the respective NFs in the mobile communication system 100. Some of the constituent elements constituting the deployment control system 500 according to the present embodiment may be provided in the MECs 450. The MECs 450 may be provided in the edge data center 420 in which the edge cloud 421 is located, in the CDC 431, or in the RDC 432.

Figure 3:
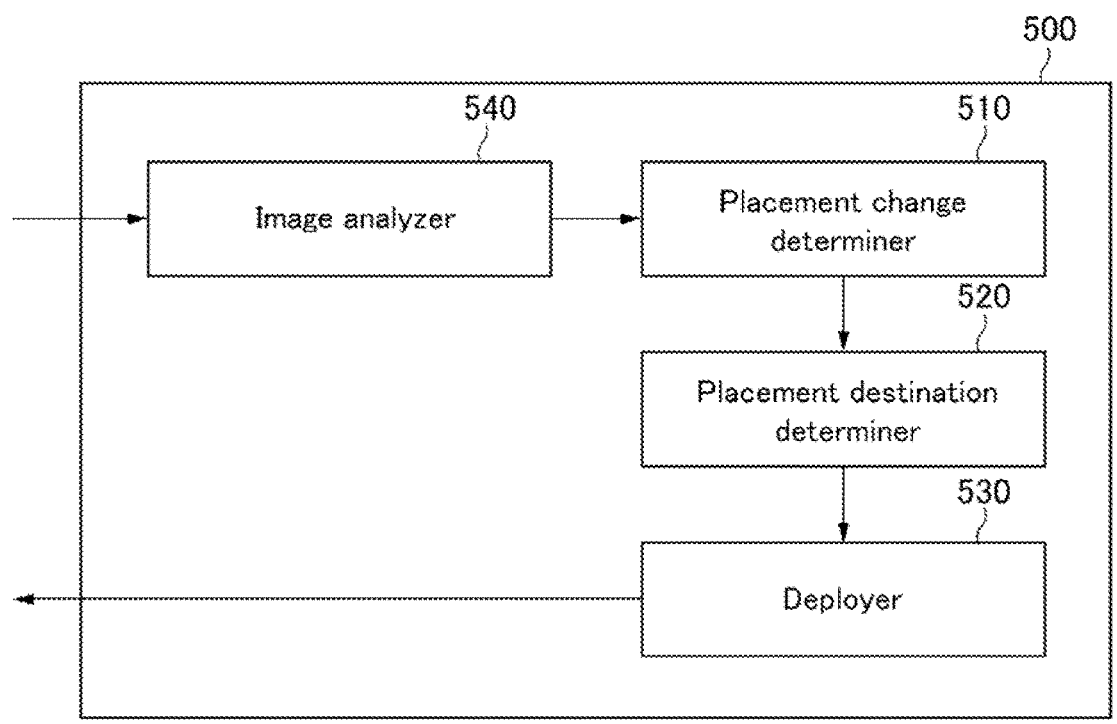
FIG. 3 is a functional block diagram illustrating the configuration of a deployment control system according to an embodiment.

Next, FIG. 3 will be used to describe the deployment control system 500 according to the present embodiment.

FIG. 3 is a block diagram illustrating the configuration of the deployment control system 500. The deployment control system 500 comprises a placement change determiner 510, a placement destination determiner 520, and a deployer 530. The deployment control system 500 may comprise an image analyzer 540.

The placement change determiner 510 determines that the placement of an NF in the mobile communication system 100 is to be changed. For example, a certain area having one or more RUs 111 in the range thereof may be predetermined, and a placement change may be determined for an NF used to process communication from radio terminals inside the area (in other words, radio terminals present within said area) in accordance with fluctuations in the modes of use of the radio terminals. Said area will also be described as a service area. The service area may, for example, be a cell formed by a single DU.

Fluctuations in the modes of use of radio terminals in the service area can be estimated from the conditions in the service area, as will be explained below. Therefore, the placement change determiner 510 can determine a placement change for at least one NF among the NFs in the mobile communication system 100 based on information associated with conditions in the service area or future conditions predicted from said conditions.

Hereinafter, information associated with the conditions in the service area or the future conditions predicted from said conditions will be referred to collectively as "service area conditions information". The service area conditions information will be explained below.

The placement change determiner 510 estimates an NF placement appropriate for the modes of use of radio terminals present in the service area based on the information (service area conditions information) associated with the conditions in the service area or future conditions predicted from said conditions. Furthermore, if the estimated NF placement is different from the current NF placement in the mobile communication system 100, then the placement change determiner 510 determines that the placement is to be changed.

More specific operations in the placement change determiner 510 will be explained below.

When the placement change determiner 510 determines that the placement is to be changed, the placement destination determiner 520 determines the NF to be changed and the change destination of the NF to be changed based on the service area conditions information. More specific operations in the placement destination determiner 520 will be explained below.

The deployer 530 executes the placement change by instantiating the NF to be changed, determined by the placement destination determiner 520, at the change destination. That is, the NF to be changed is a vNF (Virtual Network Function) realized by virtualization technology. The virtualization technology may be implemented by using common virtualization technologies such as virtual machines and containers. The deployer 530 can control the placement change of the NF in accordance with the determination results in the placement destination determiner 520 by using orchestration functions in these virtualization technologies. Not all of the NFs in the mobile communication system 100 need be realized by means of virtualization.

The image analyzer 540, for example, acquires images captured by a camera installed near the RU 111, analyzes the captured images, and extracts information (service area conditions information) associated with the conditions in the service area or future conditions predicted from said conditions. The method for analyzing the captured images and the method for extracting the conditions information in the image analyzer 540 are not particularly limited, and pattern recognition, AI (Artificial Intelligence) technology, machine learning, or the like can be used. For example, since conventional art relating to image recognition can be used to recognize the number, age, and sex of people appearing in images, the types of UEs 200 being operated thereby and the like, these may be used as the conditions in the service area. Additionally, time-series images can be used to recognize the movement directions and speeds of people in the images, and increases and decreases in the number of people that will be inside the service area after a prescribed time period can be predicted thereby.

Before providing a detailed description of the operations of the respective constituent elements in the deployment control system 500, multiple examples of placement of NFs in the mobile communication system 100 will be described by using FIG. 4 and FIG. 5.

Placement Example 1

As examples of placement of NFs in the mobile communication system 100, Placement 11, Placement 12, Placement 13, and Placement 14 are respectively illustrated in FIG. 4A, FIG. 4B, FIG. 4C, and FIG. 4D.

In FIG. 4, a site 410, an edge cloud 421, a data center 430, and a public cloud 441 are located in this order in terms of proximity to the edge with respect to the radio terminals. The public cloud 441 is located on the internet, and FIG. 4 illustrates an example in which apps, which are user applications, are placed therein. Some or all of the functions of the apps may be placed at the site 410, the edge cloud 421, or the data center 430 in accordance with the placement location of the UPF. Additionally, if an MEC 450 is provided at the site 410, then the apps may also be placed in the MEC 450.

For example, in an NF placement example with lower communication latency, some or all of the functions of the apps may be placed towards the edge in order to further lower the communication latency. Additionally, an MEC 450 located further towards the edge may be preferentially used in placements with lower communication latency than placements with higher communication latency.

In Placement 11 (see FIG. 4A), an RU, a DU, and a CU are placed at the site 410, a UPF is placed in the edge cloud 421, and an SMF and an AMF are placed at the data center 430. Additionally, in order to make the communication latency lower, some of the functions of the apps are placed at the site 410, and an MEC 450 at the site 410 is used.

In Placement 12 (see FIG. 4B), an RU is placed at the site 410, a DU and a CU are placed in the edge cloud 421, and a UPF, an SMF, and an AMF are placed at the data center 430. Additionally, in order to make the communication latency lower, some of the functions of the apps are placed in the edge cloud 421, and an MEC 450 in the edge cloud 421 is used.

In Placement 13 (see FIG. 4C), an RU is placed at the site 410, a DU, a CU, and a UPF are placed in the edge cloud 421, and an SMF and an AMF are placed at the data center 430.

In Placement 14 (see FIG. 4D), an RU is placed at the site 410, a DU is placed in the edge cloud 421, and a CU, a UPF, an SMF, and an AMF are placed at the data center 430.

The placements illustrated in FIG. 4A, FIG. 4B, FIG. 4C, and FIG. 4D are merely examples of placement candidates, and the placement candidates are not limited thereto. Additionally, the number of placement candidates is not limited to four.

Generally, the more NFs are placed towards the edge with respect to the radio terminals in the mobile communication system, the lower the communication latency due to the NF placement configuration will be, and the fewer NFs are placed towards the edge with respect to the radio terminals in the mobile communication system, the higher the communication latency due to the NF placement configuration will be.

For this reason, if the communication latencies due to Placement 11, Placement 12, Placement 13, and Placement 14 are respectively $Tdelay11$, $Tdelay12$, $Tdelay13$, and $Tdelay14$, then the communication latencies due to these NF placement configurations will have the relationship $Tdelay11 < Tdelay12 < Tdelay13 < Tdelay14$.

Placement Example 2

As other examples of placement of the NFs in the mobile communication system 100, Placement 21, Placement 22, Placement 23, and Placement 24 are respectively illustrated in FIG. 5A, FIG. 5B, FIG. 5C, and FIG. 5D.

In Placement 21 (see FIG. 5A), an RU, a DU, and a CU are placed at the site 410, a UPF and an SMF are placed in the edge cloud 421, and an AMF is placed at the data center 430. Additionally, in order to make the communication latency lower, some of the functions of the apps are placed at the site 410, and an MEC 450 at the site 410 is used.

In Placement 22 (see FIG. 5B), an RU is placed at the site 410, a DU, a CU, a UPF, and an SMF are placed in the edge cloud 421, and an AMF is placed at the data center 430. Additionally, in order to make the communication latency lower, some of the functions of the apps are placed in the edge cloud 421, and an MEC 450 in the edge cloud 421 is used.

In Placement 23 (see FIG. 5C), an RU is placed at the site 410, a DU, a CU, a UPF, and an SMF are placed in the edge cloud 421, and an AMF is placed at the data center 430.

In Placement 24 (see FIG. 5D), an RU is placed at the site 410, a DU is placed in the edge cloud 421, and a CU, a UPF, an SMF, and an AMF are placed at the data center 430. In the case in which the movement speed of a radio terminal is fast, situations in which the radio terminal moves across cells can be expected to occur more frequently. However, frequent handover can be avoided by placing the SMF, which is associated with session management, in the edge data center 430. For this reason, Placement 21, Placement 22, Placement 23, and Placement 24 are examples of placements that are suitable for cases in which the radio terminal is moving.

The placements illustrated in FIG. 5A, FIG. 5B, FIG. 5C, and FIG. 5D are merely examples of placement candidates, and the placement candidates are not limited thereto. Additionally, the number of placement candidates is not limited to four. As mentioned above, generally, the more NFs are placed towards the edge with respect to the radio terminals in the mobile communication system, the lower the communication latency due to the NF placement configuration will be, and the fewer NFs are placed towards the edge with respect to the radio terminals in the mobile communication system, the higher the communication latency due to the NF placement configuration will be.

For this reason, if the communication latencies due to Placement 21, Placement 22, Placement 23, and Placement 24 are respectively Tdelay21, Tdelay22, Tdelay23, and Tdelay24, then the communication latencies due to these NF placement configurations will have the relationship Tdelay21<Tdelay22<Tdelay23<Tdelay24.

Next, the correspondence between the information (service area conditions information) associated with the conditions in a service area or future conditions predicted from said conditions and the NF placements appropriate for the modes of use of the radio terminals present in the service area will be described. Examples of service area conditions information include those mentioned below.

(1) Number of People in Service Area

Since the rate of ownership of radio terminals is extremely high, there can be understood to be a correlation between the number of people in a service area and the traffic volume. For example, if there are many people in a service area and the service area is densely populated, then the traffic volume in the service area can be expected to be high. Conversely, if there are few people in a service area and the service area is sparsely populated, then the traffic volume in the service area can be expected to be low. Furthermore, the higher the traffic volume, the more preferable it is to adopt a placement in which the communication latency is made lower. That is, if there are many people in a service area, then it is preferable to change the NF placement configuration to a placement configuration with lower communication latency. For example, in the aforementioned example with Placement 11, Placement 12, Placement 13, and Placement 14, the higher the traffic volume, the more preferable Placement 11, in which the latency is the lowest, is.

The number and density of people in the service area can, for example, be extracted from captured images from a camera located in the service area.

(2) Attribute Information of People in Service Area

The attribute information of people includes at least one of the ages of people and the sexes of people.

The attribute information of people may include the ages of people. In general, the modes of use of radio terminals differ depending on differences in age. For example, elder age demographics tend to use radio terminals at high speed/high capacity less frequently than younger age demographics do, and conversely, younger age demographics tend to use radio terminals at high speed/high capacity more frequently. That is, if the age demographic is younger, then the traffic volume can be expected to be high, and it is preferable to change the placement configuration to one in which the communication latency due to the NF placement configuration is low. Instead of or in addition to the correlation between the ages of people and traffic volume, if a correlation between the sexes of people and traffic volume is discovered by using analysis results from big data or the like, then such a correlation could also be utilized to associate the attribute information of people (in order words, the modes of use of radio terminals present in the service area) with NF placements that are preferable in terms of communication latency.

(3) Movement Conditions of People in Service Area

If people are not moving in a service area, staying in place for long periods of time and remaining stationary, applications such as those with moving images can be expected to be used with higher frequency and the traffic volume can be expected to be higher. As mentioned above, the higher the traffic volume is, the more preferable it is to adopt a placement in which the communication latency is made lower.

Conversely, if people are moving, then they can be expected to cross between cells more frequently. In such cases, it is more preferable to adopt a placement in which the frequency of handover is reduced.

The movement conditions of the people in a service can be extracted from captured images from a camera installed in the service area.

(4) Number of Radio Terminals and Types of Radio Terminals Present in Service Area If there are many radio terminals present in a service area, then the traffic volume in the service area can be expected to be high. Conversely, if there are few radio terminals in a service area, then the traffic volume in the service area can be expected to be low.

The types of radio terminals present in a service area can be used to predict the traffic volume in the service area. Examples of types of radio terminals include feature phones, smartphones, tablet terminals, and portable PCs (Personal Computers). If the radio terminals are smartphones, tablet terminals, or portable PCs, then there is a high probability that high speed/high capacity applications will be used, and the traffic volume can be expected to be high. The traffic volume can be predicted by considering the types of radio terminals in addition to the number of radio terminals present in a service area. As mentioned above, the higher the traffic volume, the more preferable it is to adopt a placement in which the communication latency is made lower.

The number of radio terminals and the types of radio terminals present in a service area can be determined from captured images from a camera located in the service area. Additionally, the number of ratio terminals present in a service area can also be acquired by using GPS (Global Positioning System, Global Positioning Satellite).

(5) Whether or not Radio Terminals are being Used

The traffic volume in a service area could be predicted more accurately by considering, in addition to the above-mentioned information (1) to (4), whether or not the people in the service area are actually using the radio terminals.

Whether or not people present in a service area are actually using radio terminals can be extracted from captured images from a camera located in the service area by using, for example, technology such as human body posture analysis technology.

The methods for acquiring the above-mentioned information (1) to (5) are not particularly limited. For example, the deployment control system 500 may be provided with an image analyzer 540 for analyzing captured images of the service area, and the image analyzer 540 may acquire the above-mentioned information (1) to (5).

(6) RAN Information

Information associated with the actual communication conditions in the RAN 110 (hereinafter referred to as "RAN information") can be associated with NF placements appropriate for the modes of use of radio terminals present in the service area.

Examples of information associated with communication conditions in the RAN 110 include the traffic volume, the CQI (Channel Quality Indicator), and the throughput. As mentioned above, the higher the traffic volume, the more preferable it is to adopt a placement in which the communication latency is made lower. Additionally, generally speaking, if the CQI value is low, then the communication conditions are poor, the frequency of retransmission increases, and there is a high probability that the traffic volume will increase due to retransmission. Additionally, similarly, if the throughput is low, then the communication conditions are poor and there is a high probability that the desired communication latency is not being achieved. For this reason, the lower the CQI value or the lower the throughput, the more preferable it is to adopt a placement in which the communication latency is made lower. The traffic volume information may be acquired from the CU or the UPF. The CQI and throughput information may be acquired from the CU or the DU.

The service area conditions information is not limited to the above-mentioned information (1) to (6), and may be information associated with modes of use of the radio terminals present in the service area. For example, if vehicles have been detected in captured images from a camera, conditions information such as the number, attribute information, movement conditions, and the like of the vehicles in the service area may be utilized to estimate the NF placement appropriate for the modes of use of the radio terminals present in the service area. In this case, examples of the vehicles include moving vehicles such as automobiles, motorcycles, and robots, or unmanned aerial vehicles such as drones. Examples of vehicle attribute information include the vehicle types of the vehicles, information indicating whether or not the vehicles function as ICT (Information and Communication Technology) terminals, and terminal attribute information associated with attributes of the radio terminals that the vehicles have. Examples of vehicles provided with terminals having ICT functions may include vehicles such as connected cars and unmanned robots, and unmanned aerial vehicles such as drones.

Additionally, the service area conditions information may include calendar information. Calendar information includes current date information. This date information may include information associated with the current date in addition to the current date. The date information is, for example, event information indicating that today is the Y-th day in the month X (the current date), and that the Y-th day in the month X is a day on which a major sporting event that is to be distributed in real-time is to be held (information associated with the current date).

Next, the relationship between this service area conditions information and the NF placements appropriate for the modes of use of the radio terminals present in the service area estimated based on the service area conditions information will be described with reference to FIG. 6A, FIG. 6B, FIG. 6C, and FIG. 6D.

Figure 4A:
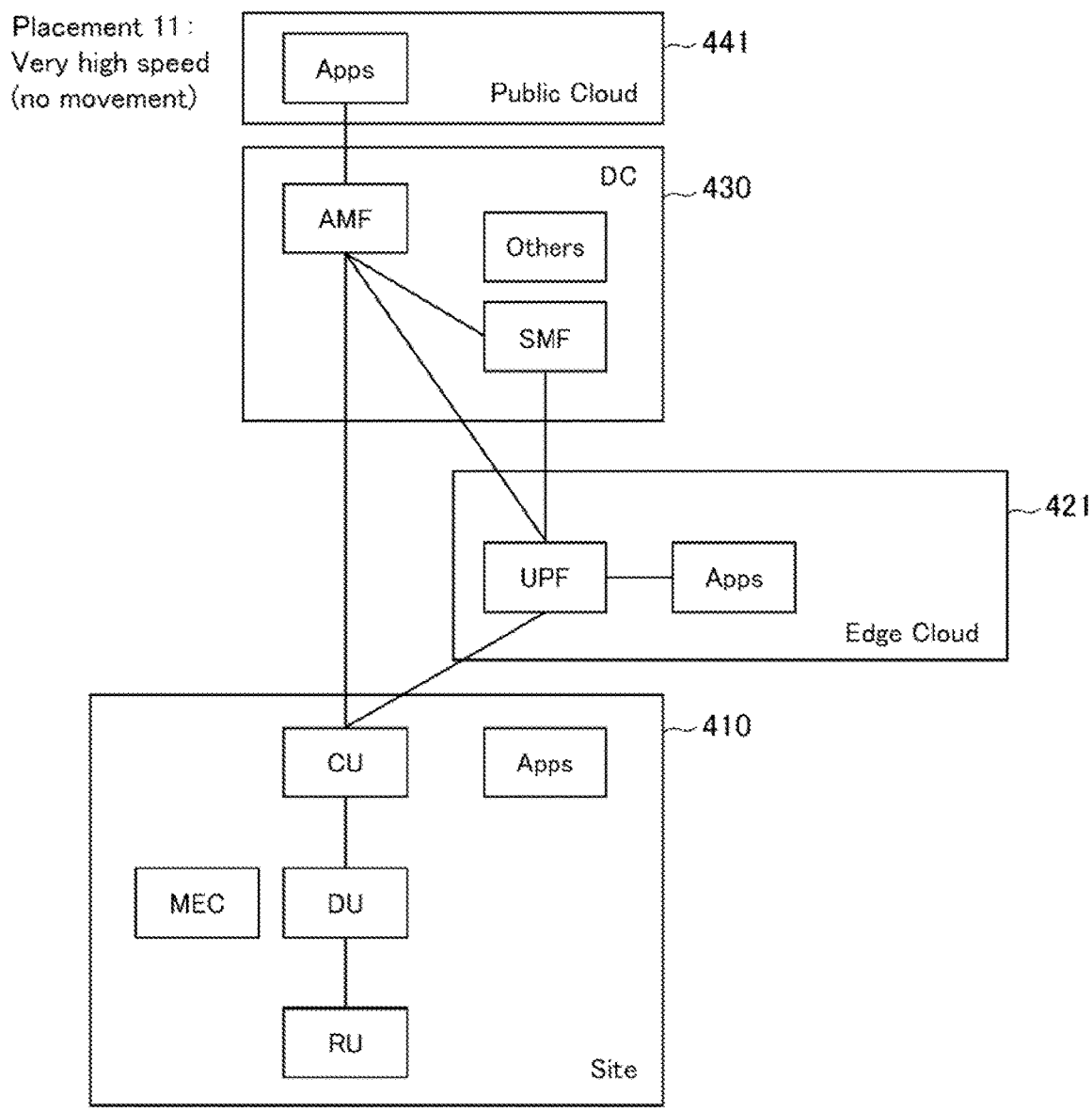
FIG. 4A is a diagram illustrating an example of the placement of NFs in the mobile communication system.

The second row in FIG. 6A indicates that if all of the conditions "many people, dense", "people not moving, stationary", "young demographic", and "people using radio terminals" are satisfied according to the service area conditions information, then the NF placement appropriate for these conditions is Placement 11 (FIG. 4A).

Figure 4B:
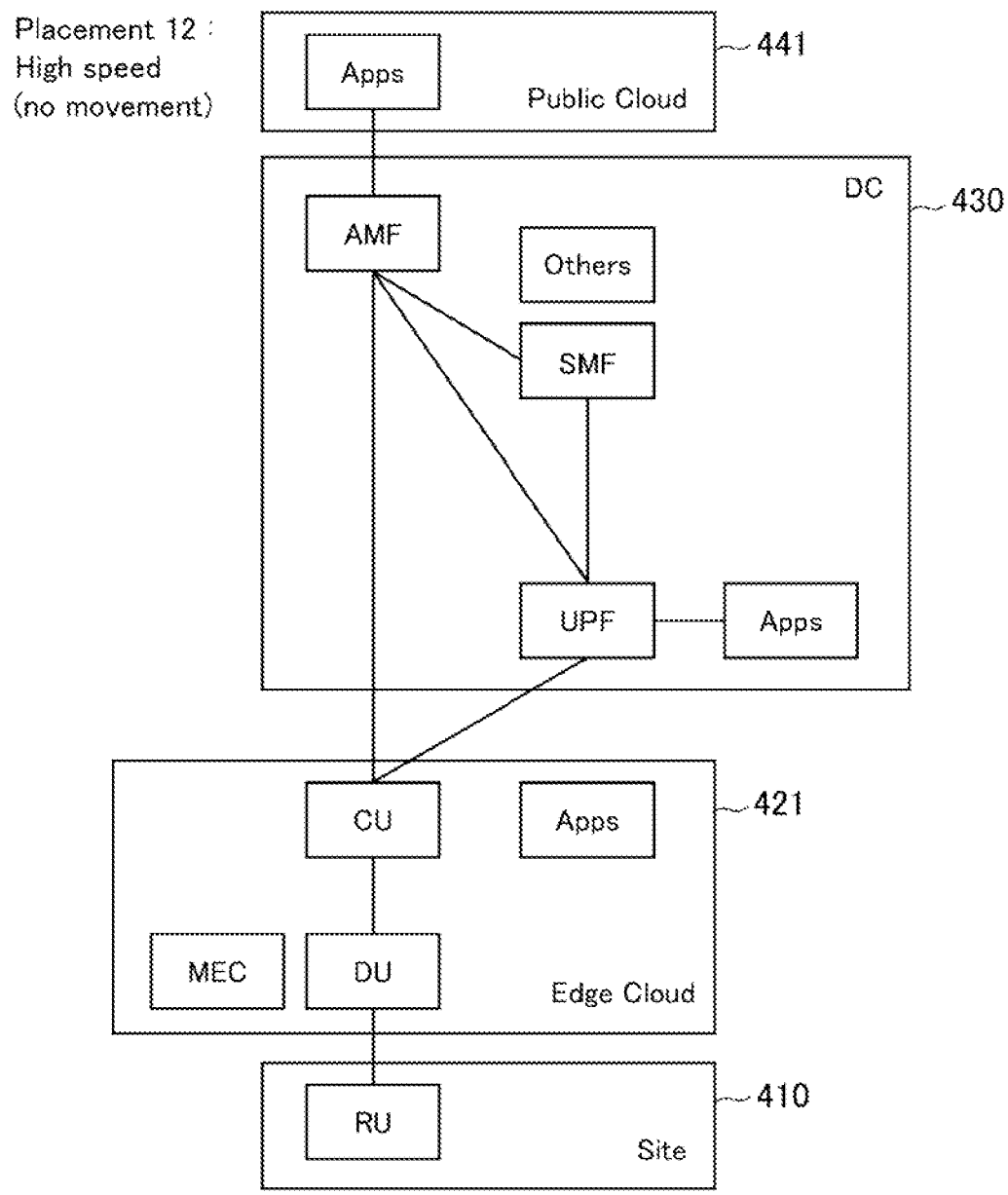
FIG. 4B is a diagram illustrating an example of the placement of NFs in the mobile communication system.

The third row in FIG. 6A indicates that if all of the conditions "many people, dense", "people not moving, stationary", "young demographic", and "people not using radio terminals" are satisfied according to the service area conditions information, then the NF placement appropriate for these conditions is Placement 12 (FIG. 4B).

The fourth row in FIG. 6A indicates that if all of the conditions "many people, dense", "people not moving, stationary", "middle-aged demographic", and "people using radio terminals" are satisfied according to the service area conditions information, then the NF placement appropriate for these conditions is Placement 11 (FIG. 4A).

The fifth row in FIG. 6A indicates that if all of the conditions "many people, dense", "people not moving, stationary", "middle-aged demographic", and "people not using radio terminals" are satisfied according to the service area conditions information, then the NF placement appropriate for these conditions is Placement 12 (FIG. 4B).

The sixth row in FIG. 6A indicates that if all of the conditions "many people, dense", "people not moving, stationary", "elder demographic", and "people using radio terminals" are satisfied according to the service area conditions information, then the NF placement appropriate for these conditions is Placement 12 (FIG. 4B).

Figure 4C:
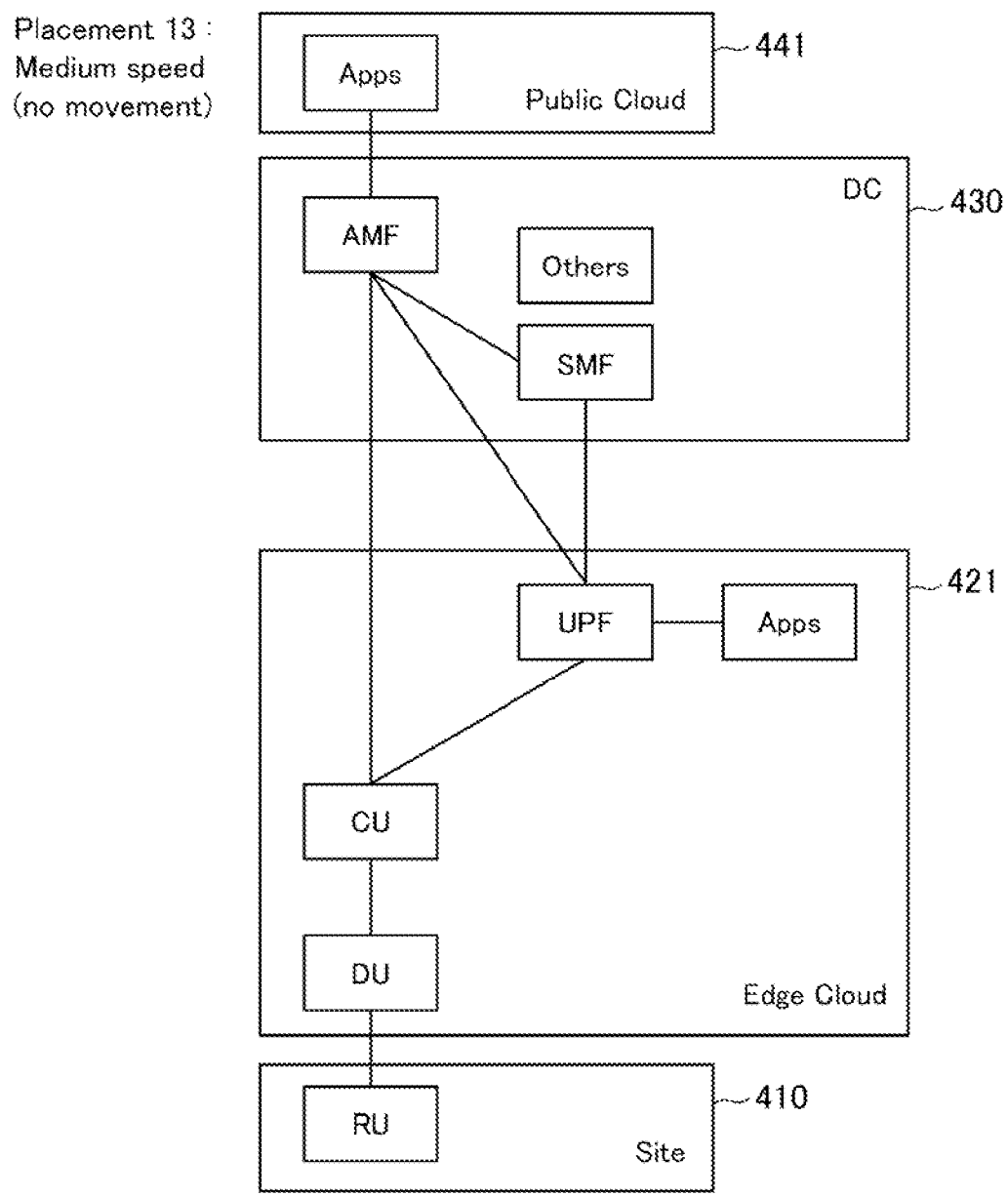
FIG. 4C is a diagram illustrating an example of the placement of NFs in the mobile communication system.
Figure 4D:
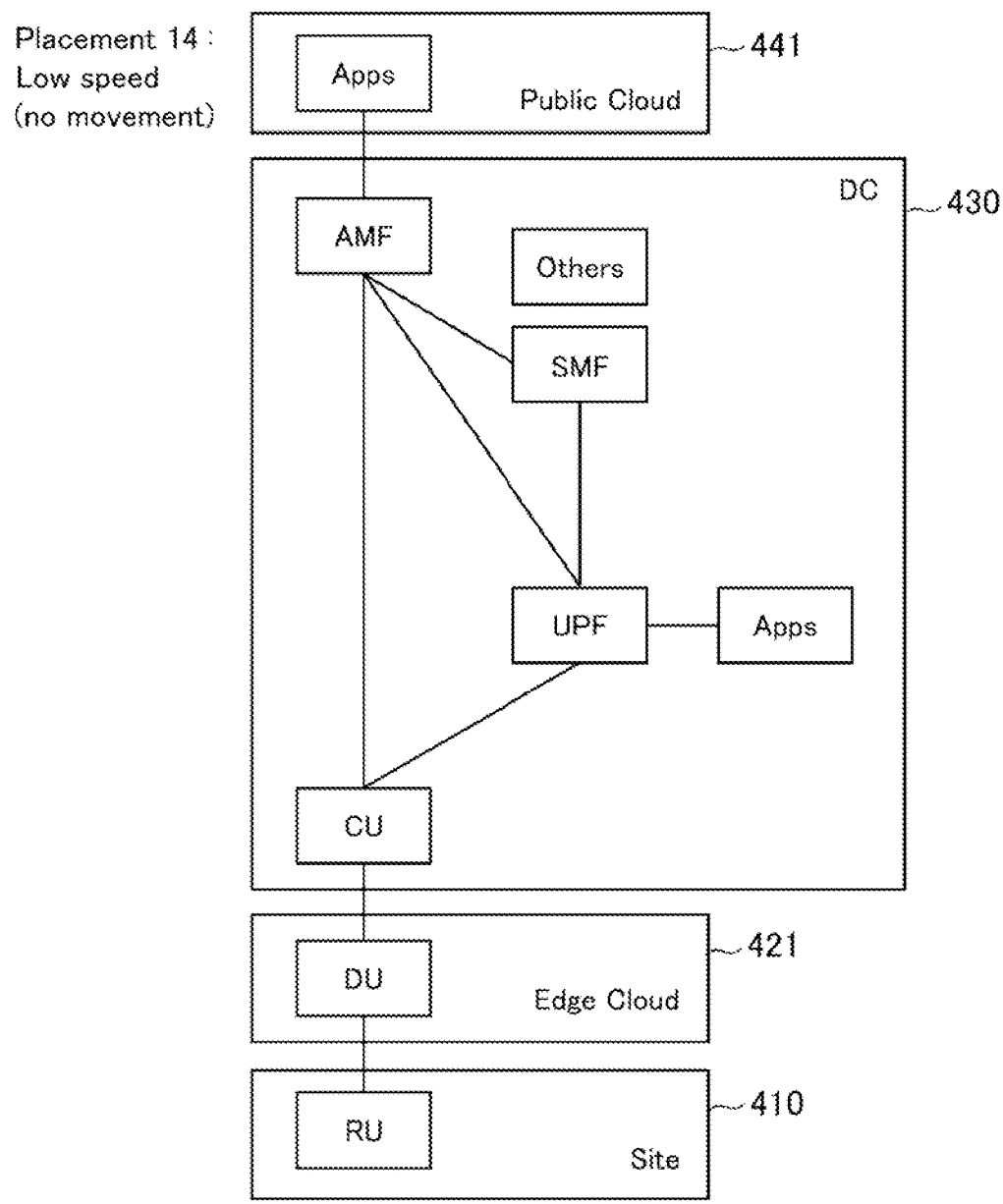
FIG. 4D is a diagram illustrating an example of the placement of NFs in the mobile communication system.
Figure 5A:
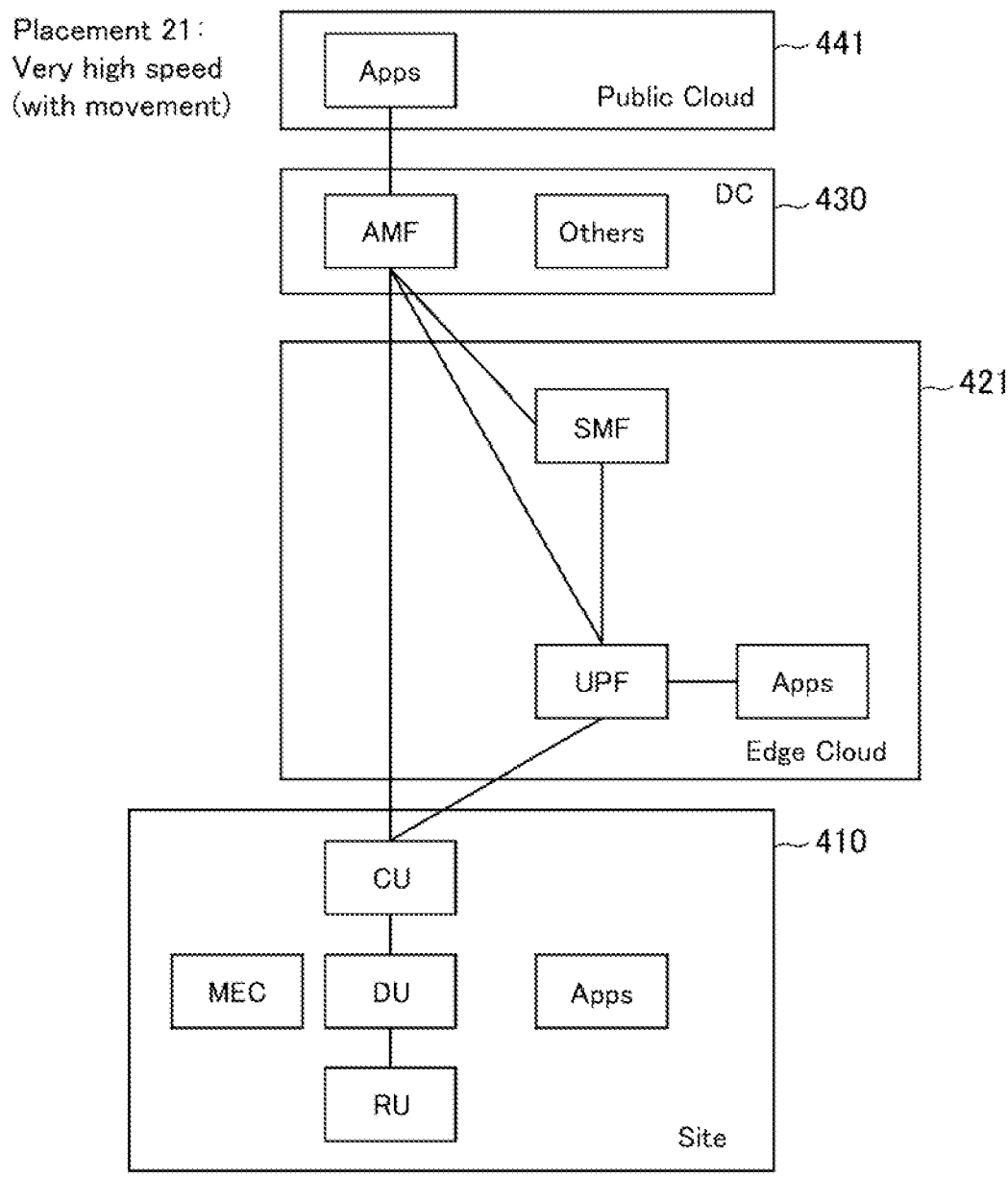
FIG. 5A is a diagram illustrating an example of the placement of NFs in the mobile communication system.
Figure 5B:
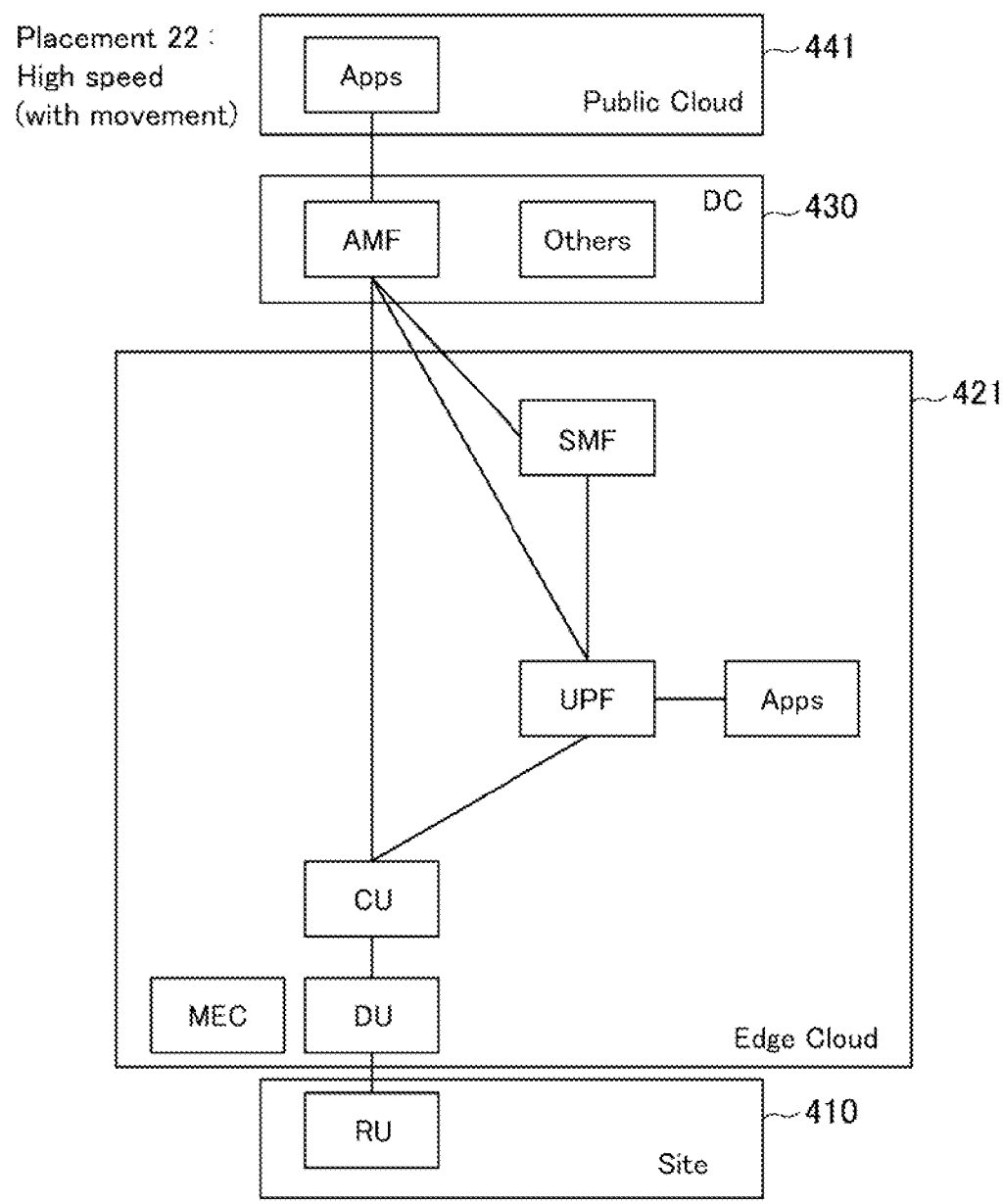
FIG. 5B is a diagram illustrating an example of the placement of NFs in the mobile communication system.
Figure 5C:
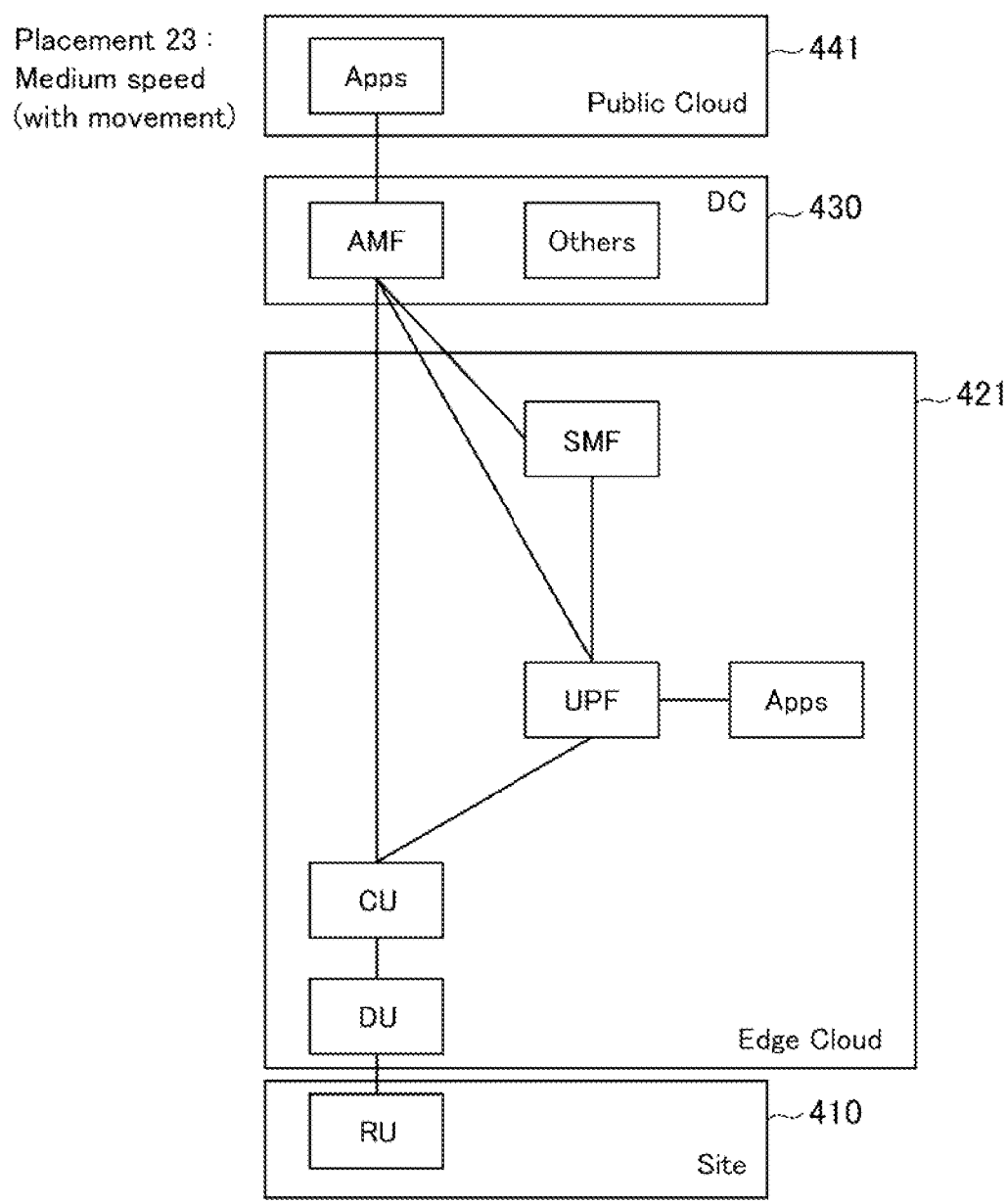
FIG. 5C is a diagram illustrating an example of the placement of NFs in the mobile communication system.
Figure 5D:
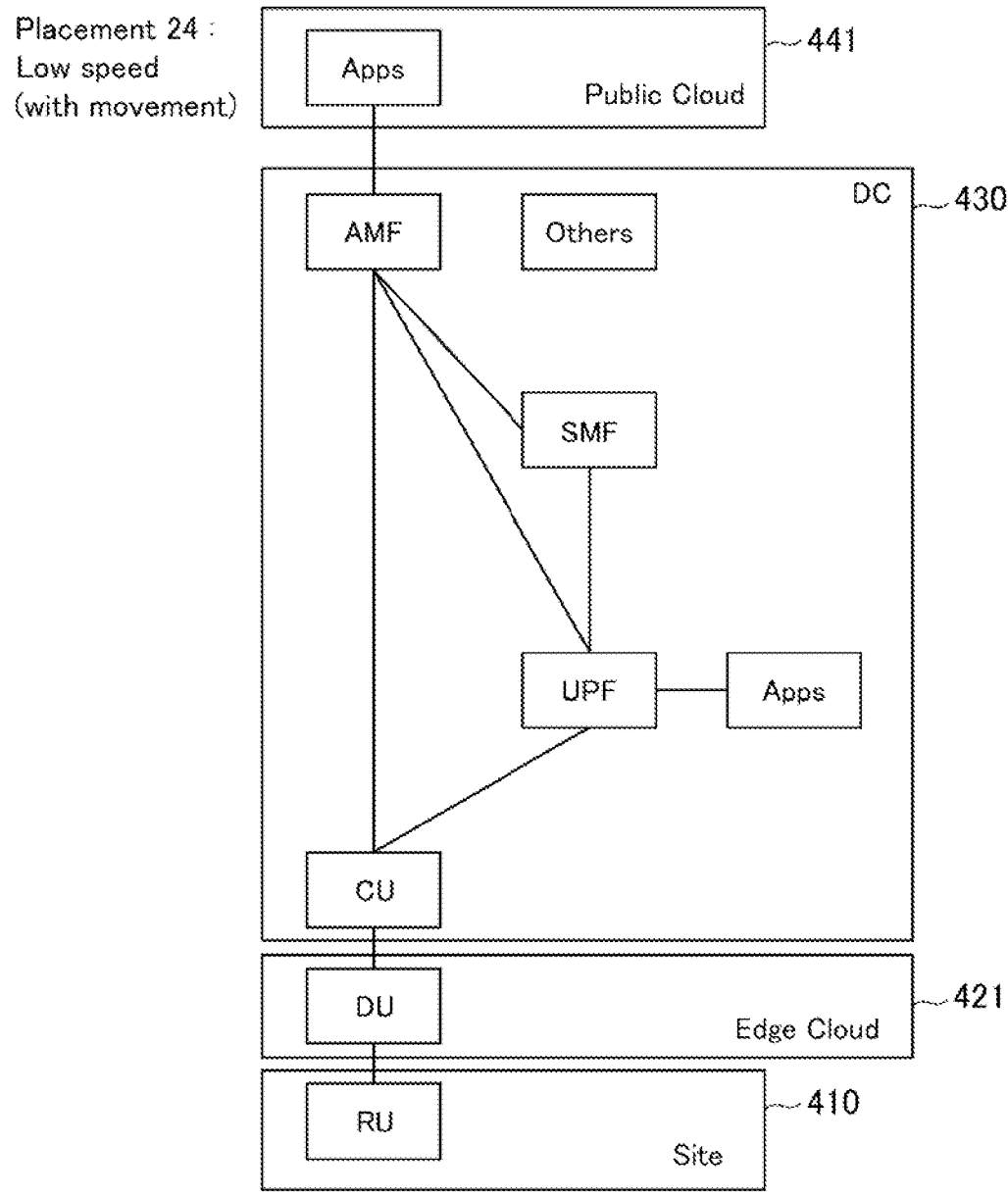
FIG. 5D is a diagram illustrating an example of the placement of NFs in the mobile communication system.

The seventh row in FIG. 6A indicates that if all of the conditions "many people, dense", "people not moving, stationary", "elder demographic", and "people not using radio terminals" are satisfied according to the service area conditions information, then the NF placement appropriate for these conditions is Placement 13 (FIG. 4C).

FIG. 6B, FIG. 6C, and FIG. 6D are diagrams illustrating examples of other combinations of service area conditions information and NF placements appropriate for the modes of use of the radio terminals present in the service area. These combinations are exemplary and the combinations are not limited to those indicated here.

The placement change determiner 510 uses correspondence tables such as, for example, those indicated in FIG. 6A, FIG. 6B, FIG. 6C, and FIG. 6D, in which service area conditions information is grouped, in advance, with NF placements appropriate for the modes of use of the radio terminals present in the service area. The placement change determiner 510 may hold the correspondence tables internally, or may reference the correspondence tables stored in external memory. Furthermore, the placement change determiner 510 estimates NF placements appropriate for the modes of use of the radio terminals present in the service area from the service area conditions information.

For example, if the service area conditions information indicates that the service area conditions satisfy all of the conditions "people are stationary", "many people, dense", "young demographic", and "people using radio terminals", then the placement change determiner 510 determines that the NF placement appropriate for the mode of use of radio terminals present in the service area is Placement 11 (see FIG. 6A).

Thus, the placement change determiner 510 estimates NF placements appropriate for the modes of use of the radio terminals present in the service area based on information (service area conditions information) associated with the conditions in the service area or future conditions predicted from said conditions. Furthermore, the placement change determiner 510 determines that the placement is to be changed if the estimated NF placement is different from the current NF placement in the mobile communication system 100.

Next, the operations in the placement destination determiner 520 will be explained.

When a placement change is determined in the placement change determiner 510, the placement destination determiner 520 determines the NFs to be changed and the placement destinations. Hereinafter, the determination of the NFs to be changed and the placement destinations will be described.

Determination Example 1

The placement destination determiner 520 determines NFs to be changed and placement destinations for the NFs to be changed in accordance with comparison results between the NF placement appropriate for the modes of use of radio terminals present in the service area estimated from the management area information and the current NF placement in the mobile communication system.

In this case, the NF placement appropriate for the modes of use of the radio terminals present in the service area is estimated in the placement change determiner 510 based on the management area information.

Hereinafter, the determination of the NFs to be changed and the placement destinations of the NFs to be changed in the placement destination determiner 520 will be described for an example of the case in which, in the placement change determiner 510, the NF placement appropriate for the modes of use of radio terminals present in the service area is assessed to be Placement 11 and the current NF placement in the mobile communication system 100 is Placement 14.

The placement destination determiner 520 compares Placement 11 with Placement 14. Placement 11 and Placement 14 differ in terms of the placement locations of the DU, the CU, and the UPF. Specifically, in Placement 11, the DU and the CU are placed at the site 410, and the UPF is placed in the edge cloud 421, whereas in Placement 14, the DU is placed in the edge cloud 421, and the CU and the UPF are placed at the data center 430. In this case, the placement destination determiner 520 determines that the DU, the CU, and the UPF are the NFs to be changed. Furthermore, the placement destination determiner 520 determines the placement destinations of the DU and the CU to be the site 410, and determines the placement destination of the UPF to be the edge cloud 421.

In this way, an improvement in the usability can be expected by adopting an NF placement appropriate for the modes of use of the radio terminals present in the service area.

Determination Example 2

The placement destination determiner 520 determines the NFs to be changed and the placement destinations of the NFs to be changed by selecting, from among a plurality of prescribed placement candidates, a placement that is predicted to make the communication latency in the radio terminals present in the service area lower than in the current placement. As a result thereof, an improvement in the usability can be expected.

For example, if the current NF placement in the mobile communication system 100 is Placement 14, then the placement destination determiner 520 selects one of Placement 11, Placement 12, and Placement 13, in which the communication latency in the radio terminals present in the service area can be predicted to be lower than in the current placement. Then, the placement destination determiner 520 determines the NFs to be changed and the placement destinations of the NFs to be changed in accordance with comparison results between the selected placement and the current NF placement in the mobile communication system 100. The NFs to be changed and the placement destinations of the NFs to be changed are determined in accordance with the comparison results in a manner similar to that in Determination Example 1 mentioned above.

Determination Example 3

The placement destination determiner 520 determines the NFs to be changed and the placement destinations thereof by selecting the candidate to be used from among a plurality of prescribed placement candidates based on service area information. For example, the placement destination determiner 520 selects, from among the plurality of prescribed placement candidates, candidates in which fewer NFs are placed towards the edge with respect to the radio terminals in the mobile communication system 100 as the traffic volume in the service area becomes lower. Additionally, the placement destination determiner 520 may select candidates in which more NFs are placed towards the edge with respect to the radio terminals in the mobile communication system 100 as the traffic volume in the service area becomes higher.

As a result thereof, as the traffic volume becomes higher, the NFs in the mobile communication system 100 are placed at the site 410, the edge cloud 421, or the data center 430. Thus, if the traffic volume is extremely high, then placements in which the communication latency due to the NF placement configuration becomes lower are adopted, and improvements in usability can be expected. Conversely, if the traffic volume is extremely low, then the CU is placed at the data center 430 and the CU can connect with more DUs. For this reason, the number of CUs needed in the mobile communication system 100 can be reduced while suppressing degradation of the usability, thereby allowing the amount of virtualization resources that are used for virtualizing the CUs to be reduced.

The placement destination determiner 520 determines the NFs to be changed and the placement destinations of the NFs to be changed in the manner described above. The placement destination determiner 520 notifies the deployer 530 of information regarding the NFs for which the placement is to be changed and the placement destinations of the NFs.

Next, the sequence diagram in FIG. 7 will be used to describe the operations in the deployment control system 500. Hereinafter, the case in which the placement change determiner 510 determines a placement change by using information acquired from captured images of the service area will be described.

FIG. 7 is a sequence diagram for the case in which the placement change determiner 510, the placement destination determiner 520, and the deployer 530 in the deployment control system 500 are located in the edge controller 460, the image analyzer 540 of the deployment control system 500 is located in the MEC 450, the RU is located at the site 410, the DU is located in the edge cloud 421, and the CU (indicated by solid lines) is located in the data center 430.

Images captured by a camera 600 are transferred to the image analyzer 540. The image analyzer 540 analyzes the captured images, acquires information (service area conditions information) associated with the conditions in the service area or future conditions predicted from said conditions, and notifies the placement change determiner 510 of the service area conditions information. The image analyzer 540 may notify the placement change determiner 510 of the service area conditions information periodically or under conditions such as only if there is a change in the modes of use of radio terminals in the service area.

The placement change determiner 510 estimates an NF placement appropriate for the modes of use of the radio terminals present in the service area based on the service area conditions information, and if the estimated NF placement is different from the current NF placement in the mobile communication system 100, determines that the placement change is to be executed. Upon determining that the placement change is to be executed, the placement change determiner 510 notifies the placement destination determiner 520 thereof.

When the placement change determiner 510 determines that the placement change is to be executed, the placement destination determiner 520 determines the NFs to be changed and the placement destinations by using, for example, Determination Example 1, 2, or 3 mentioned above. FIG. 7 illustrates an example in which the placement destination determiner 520 has determined that the CU in the RAN is to be changed, and has determined that the new placement destination of the CU is to be the edge cloud 421.

Furthermore, the deployer 530 executes the placement change by instantiating, at the change destination, the NF to be changed as determined in the placement destination determiner 520. As illustrated in FIG. 7, the deployer 530 instantiates the CU in the edge cloud 421, which is the placement destination. Thereafter, when a connection with a DU or the like to be connected to the CU (indicated by dotted lines) placed in the edge cloud 421 is established, the deployer 530 deletes the CU that was placed at the data center 430 until then.

In this way, the placement of the CU is changed from the data center 430 to the edge cloud 421.

As described above, in the deployment control system 500 according to the present embodiment, the placement change determiner 510 determines a placement change regarding at least one NF (Network Function) among the NFs in the mobile communication system 100 based on information (management area conditions information) associated with conditions or future conditions predicted from the conditions in the service area to which one or more RUs (Radio Units) in the mobile communication system 100 belong. The placement destination determiner 520 determines the NFs to be changed and the placement destinations of the NFs to be changed based on the management area conditions information. The deployer 530 executes the placement change by instantiating the NFs to be changed at the placement destinations.

As a result thereof, the NF placement in the mobile communication system is changed to an NF placement suitable for the modes of use of the radio terminals in the service area, and degradation of the usability of radio terminals can be avoided even in cases in which the modes of use are constantly fluctuating.

Modified Examples

In the description above, an example of the case in which the service area due to the deployment control system 500 includes a cell formed from a single DU (Distributed Unit) was described. However, the service area is not limited to a single cell. The service area may include a plurality of cells formed by a plurality of DUs connected to the same CU. If the CU connected to the plurality of DUs forming the plurality of cells is the same, then the plurality of cells may be cells that are located in physical proximity or may be cells that are in logical proximity.

The placement change determiner 510, for example, uses information associated with communication conditions in a RAN in the mobile communication system 100 as the information (service area conditions information) associated with the conditions in the service area or the future conditions predicted from the conditions. Examples of the information associated with the communication conditions in the RAN in the mobile communication system 100 include, as mentioned above, the traffic volume, the CQI (Channel Quality Indicator), and the throughput. The placement change determiner 510 can acquire traffic volume information from the CU or the UPF. Additionally, the placement change determiner 510 can acquire the CQI and throughput information from the CU.

Figure 8:
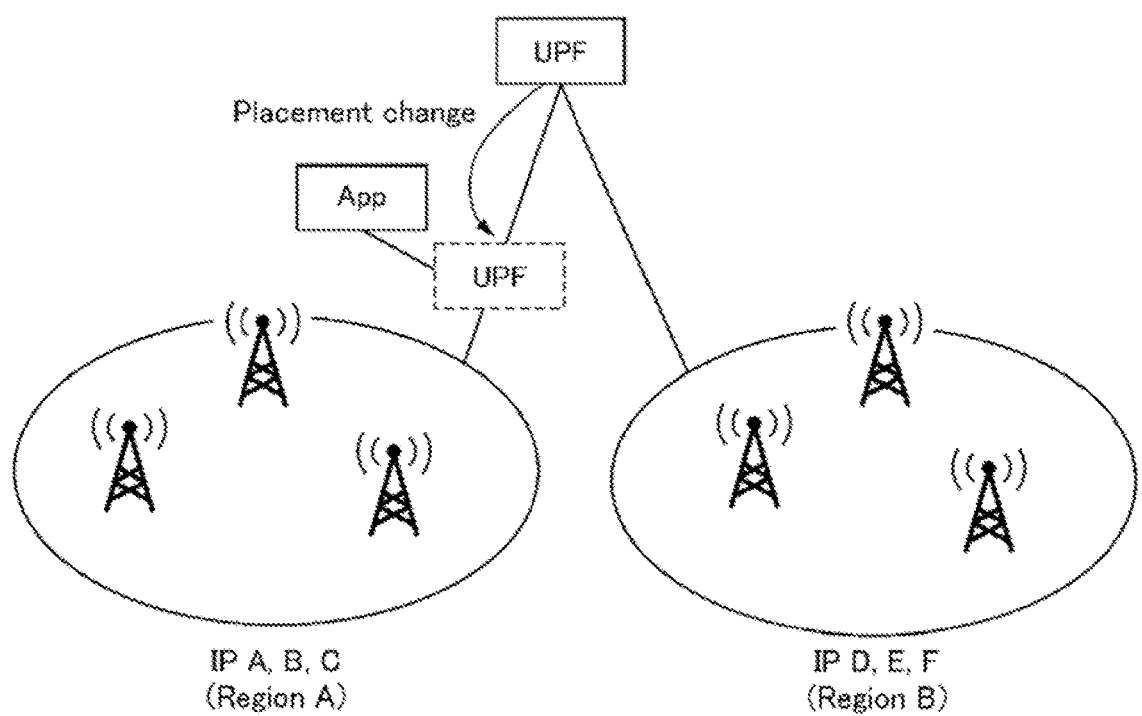
FIG. 8 is a diagram illustrating an example of a plurality of cell groups.

Additionally, the plurality of cells may be grouped into a plurality of cell groups. Each cell group includes one or a plurality of cells. FIG. 8 is a diagram illustrating an example of a plurality of cell groups. FIG. 8 illustrates an example in which a first cell group (region A) includes cells 1, 2, 3 assigned IP A, B, C, a second cell group (region B) includes cells 4, 5, 6 assigned IP D, E, F, and the radio terminals present in the first cell group and in the second cell group share the same UPF (indicated by solid lines).

If the first cell group and the second cell group share the same UPF, then the placement change determiner 510 acquires information regarding the traffic on that shared UPF, and the placement change determiner 510 determines the placement change based on the traffic volume.

5G systems are designed to be able to freely add or delete UPFs. For this reason, if a plurality of cells are grouped into a plurality of cell groups, then the placement change destination determiner 520 determines that the UPF is the NF to be changed, and determines the placement destination of the UPF to be a position closer to the edge with respect to the radio terminals in the mobile communication system than that in the current placement.

The deployer 530 instantiates the UPF (indicated by dotted lines).

FIG. 8 illustrates an example in which the placement of the UPF used by the first cell group is changed to a position closer to the edge with respect to the radio terminals in the mobile communication system.

At this time, the deployer 530 may retain the shared UPF. Due to the deployer 530 instantiating a new UPF while retaining the shared UPF that was used by the first cell group and the second cell group, the traffic volume is distributed between the shared UPF and the newly added UPF, thereby allowing the communication latency in the first cell group and in the second cell group to be reduced.

The operations in the deployment control system 500 in this case will be described by using the sequence diagram in FIG. 9.

Figure 9:
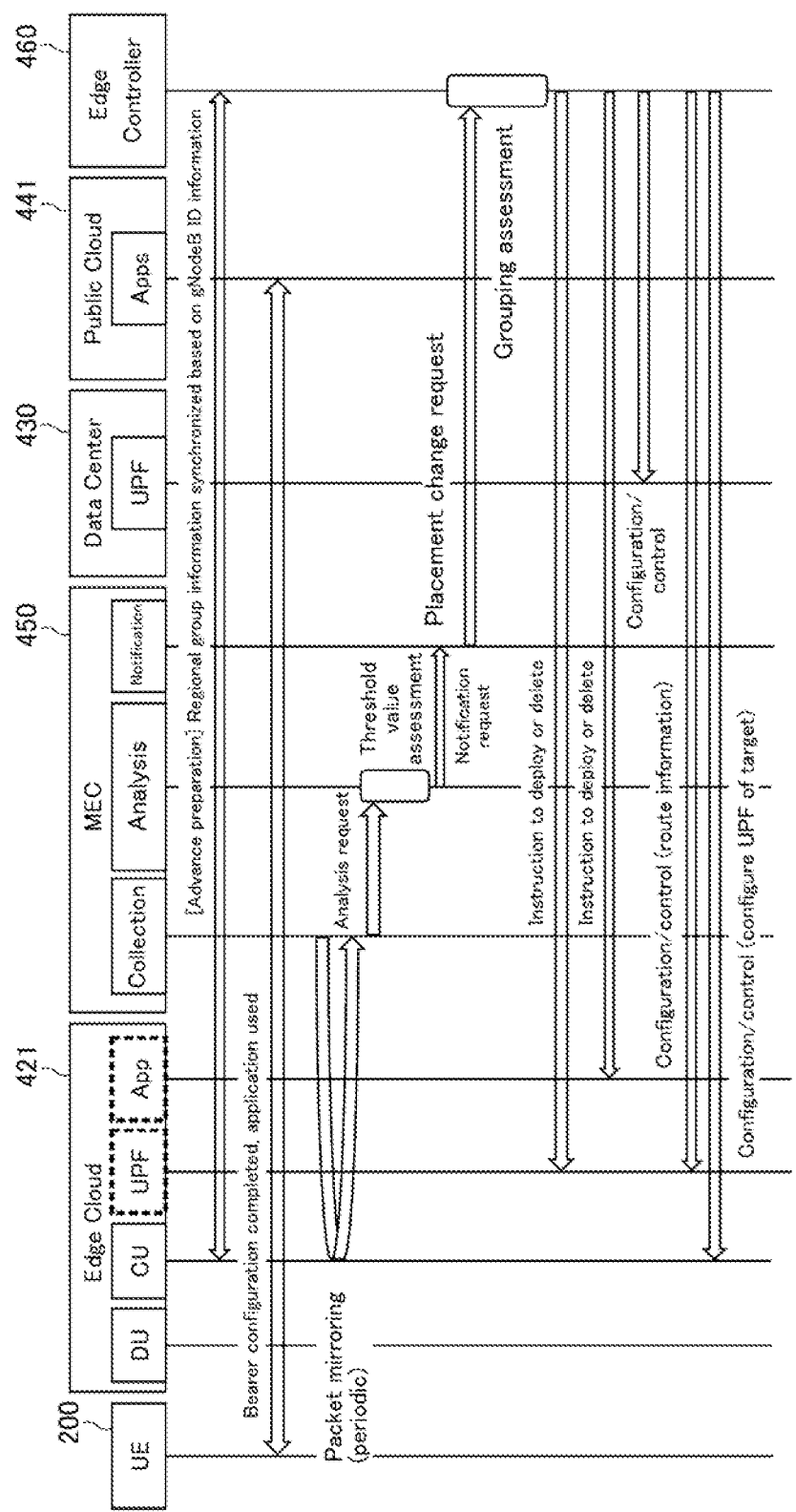
FIG. 9 is a diagram illustrating one example of the processing sequence implemented in the deployment control system according to an embodiment.

FIG. 9 illustrates an example in which the DU and the CU (both indicated by solid lines) are placed in the edge cloud 421, the placement change determiner 510 of the deployment control system 500 is located in the MEC 450, the UPF (indicated by solid lines) is placed at the data center 430, apps (indicated by solid lines) are placed in the public cloud 441, and the placement destination determiner 520 of the deployment control system 500 is located in the edge controller 460.

Based on respective gNodeB ID information, the placement change determiner 510 acquires in advance, regarding the plurality of cell groups, regional group information indicating which gNodeB is included in each cell group. A gNodeB generally refers to a base station in 5G, and the gNodeB and the DU in a RAN have a one-to-one correspondence relationship.

When bearer configuration is completed between a radio terminal (UE) and a desired application, the UE 200 becomes capable of using the desired application.

The placement change determiner 510, for example, periodically acquires packet information from the CU and acquires information regarding the traffic volume processed by the CU. Furthermore, the placement change determiner 510 compares the traffic volume with a prescribed threshold value, and if the traffic volume is high, determines that a placement change is to be executed. When it is determined that a placement change is to be executed, the placement change determiner 510 requests the placement destination determiner 520 to execute the placement change.

When it is determined that a placement change is to be executed in the placement change determiner 510, the placement destination determiner 520 acquires, from the regional group information, information regarding the presence and absence of cell groups, and gNodeB information included in the respective cell groups. Furthermore, upon confirming the presence of a plurality of cell groups from the regional group information, the placement destination determiner 520 determines, as the NF to be changed, a UPF for forming at least one cell group among the plurality of cell groups. Additionally, the placement destination determiner 520 determines, as the placement destination at which the UPF is to be instantiated, a position more towards the edge with respect to the radio terminals in the mobile communication system, such that the communication latency is decreased.

FIG. 9 illustrates an example in which the placement destination determiner 520 has determined that the placement destination of the UPF is to be the edge cloud 421. In this case, the placement destination determiner 520 may determine that apps to which the UPF is connected are also to be changed, and may determine that the placement destination of some of the apps is to be the same edge cloud 421 as the UPF.

When the NFs to be placed and the placement destinations are determined in the placement destination determiner 520, the deployer 530 implements control to deploy, delete, configure routes, and the like for the NFs.

As illustrated in FIG. 9, the deployer 530 instantiates a CU and an app (both indicated by dotted lines) in the edge cloud 421, which is the placement destination.

If the traffic volume is high, then it is highly likely that there is communication latency and the usability is degraded. However, due to the placement of the UPF being changed from the data center 430 to the edge cloud 421, the communication latency due to the placement configuration is shortened, thus improving the usability.

Next, the deployment control method according to the present embodiment will be described.

Figure 10:
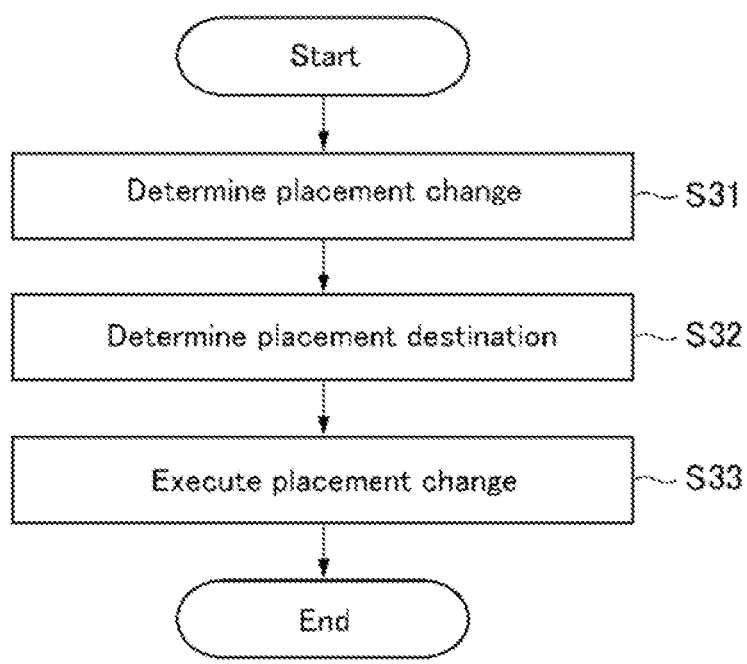
FIG. 10 is a diagram illustrating a flow chart of a deployment control method according to an embodiment.

FIG. 10 is a diagram illustrating a flow chart of the deployment control method according to the present embodiment.

The placement change determiner 510 determines, based on information (service area conditions information) associated with conditions or future conditions estimated from the conditions in a service area to which one or more RUs in the mobile communication system 100 belong, a placement change regarding at least one NF among the NFs in the mobile communication system 100 (S31).

The placement destination determiner 520 determines, based on the service area conditions information, an NF to be changed and a placement destination of the NF to be changed (S32).

The deployer 530 executes the placement change by instantiating the NF to be changed at the placement destination (S33).

In S31, the placement change determiner 510 may estimate, based on the service area conditions information, an NF placement appropriate for a mode of use of a radio terminal present in the service area, and may determine that the placement change is to be executed if the estimated NF placement is different from the current NF placement in the mobile communication system 100.

In S31, the placement change determiner 510 may use a correspondence table, in which the service area conditions information has been grouped in advance with NF placements appropriate for modes of use of the radio terminal, to estimate, from the service area conditions information, the NF placement appropriate for the mode of use of the radio terminal present in the service area.

In S32, the placement destination determiner 520 may determine the NF to be changed and the placement destination in accordance with a comparison result between the NF placement appropriate for the mode of use of the radio terminal present in the service area estimated from the service area conditions information and the current NF placement in the mobile communication system 100.

In S32, the placement destination determiner 520 may determine the NF to be changed and the placement destination by selecting, from among a plurality of prescribed placement candidates, a placement predicted to make the communication latency of the radio terminal present in the service area lower than a current communication latency.

In S32, the placement destination determiner 520 may determine the NF to be changed and the placement destination by selecting the candidate to be used from among the plurality of prescribed placement candidates based on service area information.

In this case, the placement destination determiner 520 may select candidates such that, as the traffic volume in the service area becomes lower, fewer of the NFs are placed towards an edge of the mobile communication system with respect the radio terminal. Additionally, the placement destination determiner 520 may select candidates such that, as the traffic volume in the service area becomes higher, more of the NFs are placed towards an edge of the mobile communication system with respect the radio terminal.

In S32, if the plurality of cells are grouped in a plurality of cell groups, then the placement change determiner 520 may determine that a UPF is the NF to be changed.

Figure 11:
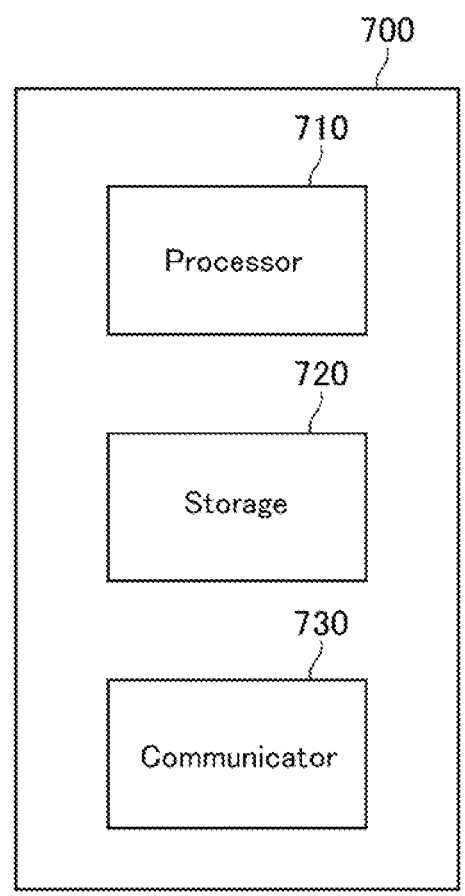
FIG. 11 is a diagram illustrating a computer system in which the control system is installed.

FIG. 11 is a diagram illustrating a computer system 700 in which the deployment control system 500 according to the present embodiment is implemented. The computer system 700 includes a processor 710, storage 720, and a communicator 730. The numbers of the processor 710, the storage 720, and the communicator 730 are not limited, and there may be one or a plurality thereof. Additionally, the processor 710, the storage 720, and the communicator 730 may be placed together in the locations at which the respective constituent elements constituting the deployment control system 500 are placed. The processor 710 is a program control device, such as a microprocessor, that operates in accordance with a program installed in the deployment control system 500. The storage 720 is a storage element such as a ROM or a RAM, or a storage device such as a solid-state drive (SSD) or a hard disk drive (HDD). The storage 720 stores a program or the like executed by the processor 22. The communicator 730 is, for example, a communication interface such as an NIC or a wireless LAN module. The communicator 730 may be installed with SDN (Software-Defined Networking).

The present invention is not limited to the configurations mentioned above, and the present invention also includes a deployment control program. Specifically, a control program for making one or more processors execute the respective constituent elements in the deployment control system 500 is also included in the present invention.

The above-mentioned program may be provided by being recorded on a computer-readable, non-transitory storage medium.

Additionally, the present invention is not limited to the embodiments described above, and includes various modified examples in which constituent elements have been added, removed or replaced with respect to the configurations indicated above.

REFERENCE SIGNS LIST

110 Radio access network (RAN: Radio Access Network)
111 RU (Radio Unit)
112 DU (Distributed Unit)
113 CU (Central Unit)
120 Core network (CN: Core Network)
121 AMF (Access and Mobility Management Function)
122 SMF (Session Management Function)
123 UPF (User Plane Function)
200 Radio terminal (UE: User Equipment)
300 App, Apps
400 Data center group
410 Site
420 Edge data center
421 Edge cloud
430 Data center
431 Central data center (CDC: Central Data Center)
432 Regional data center (RDC: Regional Data Center)
440 Public data center (PDC: Public Data Center)
441 Public cloud
500 Deployment control system
510 Placement change determiner
520 Placement destination determiner
530 Deployer
540 Image analyzer
600 Camera
700 Computer system
710 Processor
720 Storage
730 Communicator

The invention claimed is:

1. A deployment control system, comprising:
at least one processor configured to:
  receive, from a camera, an image of a service area;
  analyze the image to determine information associated with conditions or future conditions estimated from the conditions in the service area;
  determine, based on the information associated with conditions or future conditions estimated from the conditions in the service area to which one or more RUs (Radio Units) in a mobile communication system belong, a placement change regarding at least one NF (Network Function) among NFs in the mobile communication system;
  determine, based on the information, an NF to be changed and a placement destination of the NF to be changed; and
executing the placement change by instantiating the NF to be changed at the placement destination, wherein
the service area includes a plurality of cells formed by a plurality of DUs,
the plurality of DUs are connected to the same CU (Central Unit), and
based on determining the plurality of cells are grouped in a plurality of cell groups, the at least one processor is further configured to determine that a UPF (User Plane Function) is the NF to be changed.

2. The deployment control system according to claim 1, wherein the NFs (Network Functions) in the mobile communication system include an SNF (Service Network Function), a CU (Central Unit), and a DU (Distributed Unit).

3. The deployment control system according to claim 1, wherein the at least one processor is further configured to estimate, based on the information, an NF placement appropriate for a mode of use of a radio terminal present in the service area, and determine that the placement change is to be executed if the estimated NF placement is different from the current NF placement in the mobile communication system.

4. The deployment control system according to claim 3, wherein the at least one processor is further configured to use a correspondence table, in which the information has been grouped in advance with NF placements appropriate for modes of use of the radio terminal, to estimate, from the information, the NF placement appropriate for the mode of use of the radio terminal present in the service area.

5. The deployment control system according to claim 3, wherein the at least one processor is further configured to determine the NF to be changed and the placement destination in accordance with a comparison result between the NF placement appropriate for the mode of use of the radio terminal present in the service area estimated from the information and the current NF placement in the mobile communication system.

6. The deployment control system according to claim 1, wherein the at least one processor is further configured to determine the NF to be changed and the placement destination by selecting, from among a plurality of prescribed placement candidates, a placement predicted to make a communication latency of the radio terminal present in the service area lower than a current communication latency.

7. The deployment control system according to claim 1, wherein the at least one processor is further configured to determine the NF to be changed and the placement destination by selecting the candidate to be used from among the plurality of prescribed placement candidates based on the information.

8. The deployment control system according to claim 7, wherein the at least one processor is further configured to select the candidate such that, as a traffic volume in the service area becomes lower, fewer of the NFs are placed towards an edge of the mobile communication system with respect the radio terminal.

9. The deployment control system according to claim 7, wherein the at least one processor is further configured to select the candidate such that, as a traffic volume in the service area becomes higher, more of the NFs are placed towards an edge of the mobile communication system with respect the radio terminal.

10. The deployment control system according to claim 1, wherein the information includes at least one of a number of people in the service area, attribute information of people in the service area, movement conditions of people in the service area, a number of radio terminals present in the service area, and types of radio terminals present in the service area.

11. The deployment control system according to claim 1, wherein the information includes information associated with RAN (Radio Access Network) communication conditions in the mobile communication system.

12. The deployment control system according to claim 1, wherein the service area includes a cell formed by a single DU (Distributed Unit).

13. The deployment control system according to claim 1, wherein the SNF is associated with session management in a core network in the mobile communication system.

14. A deployment control method, comprising:
receiving, from a camera, an image of a service area;

analyzing the image to determine information associated with conditions or future conditions estimated from the conditions in the service area;

determining, based on the information associated with conditions or future conditions estimated from the conditions in the service area to which one or more RUs (Radio Units) in a mobile communication system belong, a placement change regarding at least one NF (Network Function) among NFs in the mobile communication system;

determining, based on the information, an NF to be changed and a placement destination of the NF to be changed; and executing the placement change by instantiating the NF to be changed at the placement destination, wherein the service area includes a plurality of cells formed by a plurality of DUs, the plurality of DUs are connected to the same CU (Central Unit), and the determining the NF to be changed includes determining, based on determining the plurality of cells are grouped in a plurality of cell groups, that a UPF (User Plane Function) is the NF to be changed.

15. A non-transitory computer readable medium having stored thereon a deployment control program comprising: receiving, from a camera, an image of a service area;

analyzing the image to determine information associated with conditions or future conditions estimated from the conditions in the service area;

determining, based on the information associated with conditions or future conditions estimated from the conditions in the service area to which one or more RUs (Radio Units) in a mobile communication system belong, a placement change regarding at least one NF (Network Function) among NFs in the mobile communication system;

determining, based on the information, an NF to be changed and a placement destination of the NF to be changed; and executing the placement change by instantiating the NF to be changed at the placement destination, wherein the service area includes a plurality of cells formed by a plurality of DUs, the plurality of DUs are connected to the same CU (Central Unit), and the determining the NE to be changed includes determining, based on determining the plurality of cells are grouped in a plurality of cell groups, that a UPF (User Plane Function) is the NF to be changed.

\* \* \* \* \*